US012362127B2

(12) United States Patent
Kirkham et al.

(10) Patent No.: US 12,362,127 B2
(45) **Date of Patent: *Jul. 15, 2025**

(54) ANODES, COOLING SYSTEMS, AND X-RAY SOURCES INCLUDING THE SAME

(71) Applicant: Varex Imaging Corporation, Salt Lake City, UT (US)

(72) Inventors: David Kirkham, South Jordan, UT (US); Vance Scott Robinson, South Jordan, UT (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,196

(22) Filed: Jun. 30, 2023

(65) Prior Publication Data

US 2023/0352261 A1 Nov. 2, 2023

Related U.S. Application Data

(63) Continuation of application No. 17/173,036, filed on Feb. 10, 2021, now Pat. No. 11,749,489.

(Continued)

(51) Int. Cl.

*H01J 35/12* (2006.01)
*H01J 35/08* (2006.01)

(52) U.S. Cl.

CPC ............ *H01J 35/12* (2013.01); *H01J 35/112* (2019.05)

(58) Field of Classification Search

CPC ...... H01J 35/16; H01J 35/107; H01J 2235/20; H01J 2235/086; H01J 29/48; H01J 35/104;

(Continued)

(56) References Cited

U.S. PATENT DOCUMENTS 2,952,790 A 7/1957 Steen
4,165,472 A 8/1979 Wittry (Continued)

FOREIGN PATENT DOCUMENTS

DE 4432205 C1 1/1996
DE 19854484 C1 5/2000

(Continued)

OTHER PUBLICATIONS

PCT/US2021/065844, International Search Report dated Jul. 7, 2022.

(Continued)

*Primary Examiner* — Don K Wong
(74) *Attorney, Agent, or Firm* — Dorsey & Whitney LLP

(57) ABSTRACT

Embodiments include a system, comprising: a vacuum enclosure; an anode support structure penetrating the vacuum enclosure and including a plurality of first cooling passages; and an anode disposed within the vacuum enclosure, coupled to and supported by the anode support structure, and including: a target; and a plurality of second cooling passages; wherein: each of the second cooling passages is coupled to a corresponding first cooling passage; the anode is coupled to the anode support structure on a side of the anode different from a side of the anode including the target and different from axial ends of the anode on a major axis of the anode; and the anode is a linear anode.

20 Claims, 14 Drawing Sheets

Related U.S. Application Data

(60) Provisional application No. 63/133,065, filed on Dec. 31, 2020.

(58) Field of Classification Search
CPC .......... H01J 37/3435; H01J 2235/1086; H01J 37/3497; H01J 2235/1279; H01J 2235/1216; H01J 37/342; H01J 35/13; H01J 2235/1266; H01J 2235/1295; H01J 2235/081; H01J 2235/1033; H01J 35/105; H01J 35/12; H01J 37/32458; H01J 2235/082; H01J 2235/108; H01J 2235/127; H01J 35/08; H01J 37/16; H05G 1/025; H05G 1/04
See application file for complete search history.

(56) References Cited

U.S. PATENT DOCUMENTS

| | | | |
|---|---|---|---|
| 4,455,504 | A | 6/1984 | Iversen |
| 4,622,687 | A | 11/1986 | Whitaker et al. |
| 5,018,181 | A | 5/1991 | Iversen et al. |
| 5,515,414 | A | 5/1996 | d' Achard Van Enschut et al. |
| 7,349,525 | B2 | 3/2008 | Morton et al. |
| 7,738,632 | B2 | 6/2010 | Popescu et al. |
| 7,974,384 | B2 | 7/2011 | Legall et al. |
| 7,979,384 | B2 | 7/2011 | Legall et al. |
| 8,009,805 | B2 | 8/2011 | Smith et al. |
| 8,090,075 | B2 | 1/2012 | Holm et al. |
| 9,263,225 | B2 | 2/2016 | Morton et al. |
| 9,564,284 | B2 | 2/2017 | Gerzokovitz et al. |
| 11,749,489 | B2 * | 9/2023 | Kirkham ................ H01J 35/112 378/143 |
| 2006/0013364 | A1 | 1/2006 | Sakata et al. |
| 2007/0297570 | A1 | 12/2007 | Kerpershoek et al. |
| 2008/0137812 | A1 | 6/2008 | Frontera et al. |
| 2010/0008471 | A1 | 1/2010 | Morton |

FOREIGN PATENT DOCUMENTS

| | | | |
|---|---|---|---|
| DE | 102017008810 | A1 | 3/2019 |
| DE | 102017008921 | A1 | 3/2019 |
| EP | 0034768 | A2 | 9/1981 |
| EP | 1277439 | A1 | 1/2003 |
| EP | 3537978 | A2 | 9/2019 |
| FR | 805193 | A | 11/1936 |
| JP | 2012104391 | A | 5/2012 |
| KR | 101140993 | B1 | 4/2012 |
| KR | 101151858 | B1 | 6/2012 |
| WO | 95019039 | | 7/1995 |
| WO | 2008148426 | A1 | 12/2008 |

OTHER PUBLICATIONS

PCT/US2021/065844, Written Opinion dated Jul. 7, 2022.
U.S. Appl. No. 17/173,036; Office Action dated Dec. 27, 2021.
U.S. Appl. No. 17/173,036; Interview Summary dated Jun. 17, 2022.
U.S. Appl. No. 17/173,036; Response to Office Action dated Jun. 27, 2022.
U.S. Appl. No. 17/173,036; Notice of Allowance dated Nov. 2, 2022.
U.S. Appl. No. 17/173,036; Notice of Allowance dated Jan. 5, 2023.
U.S. Appl. No. 17/173,036; Notice of Allowance dated Apr. 27, 2023.
EP21916566.9 Extended European Search Report dated Oct. 24, 2024. 4 pages.
EP21916566.9 Communication Pursuant to Rule 114(2) EPC (Third Party Observations) dated May 23, 2025.
H&P Advanced Technology. Medical Technology and Security Technology. Retrieved web page on May 23, 2025. https://www.hp-adtec.de/page/en/projects/medical-technology-security-technology.php.
EP21916566.9 Communication Pursuant to Rule 114(2) EPC (Third Party Observations) dated May 15, 2025.

* cited by examiner

ANODES, COOLING SYSTEMS, AND X-RAY SOURCES INCLUDING THE SAME

X-ray sources may be configured to generate multiple x-ray beams. An array of emitters may emit multiple electron beams towards a target or targets on an anode. Some linear anodes include a target having a length that is significantly greater than the width. The electron beams may be directed towards the target to hit the target in a line along the length. The incident electron beams generate heat in the anode. The anode may be cooled by a coolant, such as water or dielectric oil, that is supplied at one of the ends of the anode. Support for the anode may be located on the ends of the anode.

DETAILED DESCRIPTION

Some embodiments relate to anodes, cooling systems for anodes, and x-ray sources including such anodes and cooling systems.

Some x-ray sources supply coolant to an anode at an end of the length of the anode. A single bore may be formed within a body of the anode. A tube may be placed inside to create two fluid passages for coolant to enter and exit. The coolant is supplied to the anode from outside of the vacuum chamber. As a result, insulators, standoffs, or other structures intended to support the anode and/or supply the coolant will be disposed on the end of the anode.

Necessarily, the wall of the vacuum enclosure will be offset from the anode. The support structures and the cooling structures will add to the length of the x-ray source. Length referring to the larger dimension along which the emitters are positioned, such as the X direction in various figures described below. In some systems, multiple x-ray sources are placed end to end. The resulting x-ray beams from these x-ray sources will have a gap that depends on the length of the structures intended to support the anode and/or supply the coolant.

In addition, thermal expansion may cause deformation. For example, a temperature difference between the target side of the anode and the non-target side may cause deformation. If the hot side of the anode where the target is located and the cold side that is opposite of target are different in temperature then the anode may bow because the hotter side wants to grow more than the cooler side. In another example, if the anode is significantly hotter than the surrounding enclosure the anode may expand relative to the enclosure. If the anode is fixed and/or supported at each end of the enclosure, this thermal growth would cause the enclosure to warp and/or the anode to buckle or deform In another example, supplying the coolant from one end of the anode may cause deformation of the anode. The initially cooler coolant may enter one end of the anode. As a result, the end of the anode where the coolant enters may operate at a lower temperature than the far end. The anode may warp and/or deform due to the temperature difference. The change in the location of the target or anode may cause the focal spot or spots to shift, change size, distort, or the like.

As will be described in further detail below, in some embodiments, the support and cooling passages (or cooling channels) may be disposed on a central and/or back side of the anode. The support and/or cooling passages may provide the electrical connection to the anode.

Figure 1A:
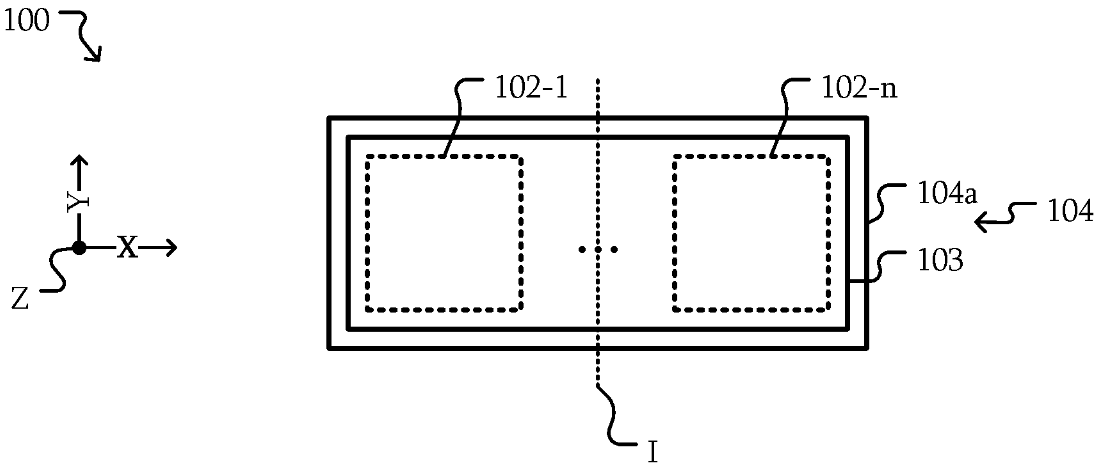
FIG. 1A is an overhead view of an anode of an x-ray system according to some embodiments.
Figure 1B:
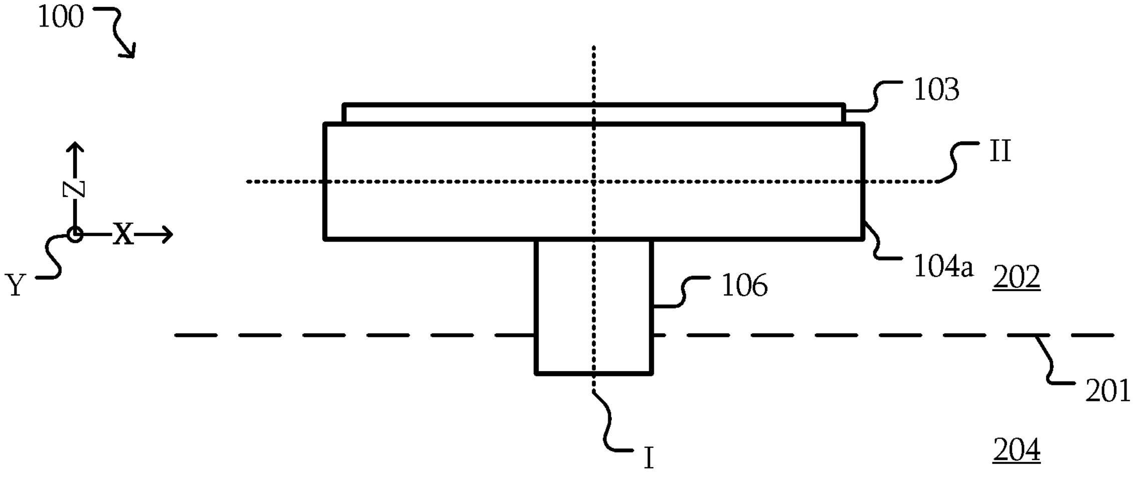
FIG. 1B is a side view of the anode of FIG. 1A and an anode support structure according to some embodiments.
Figure 1C:
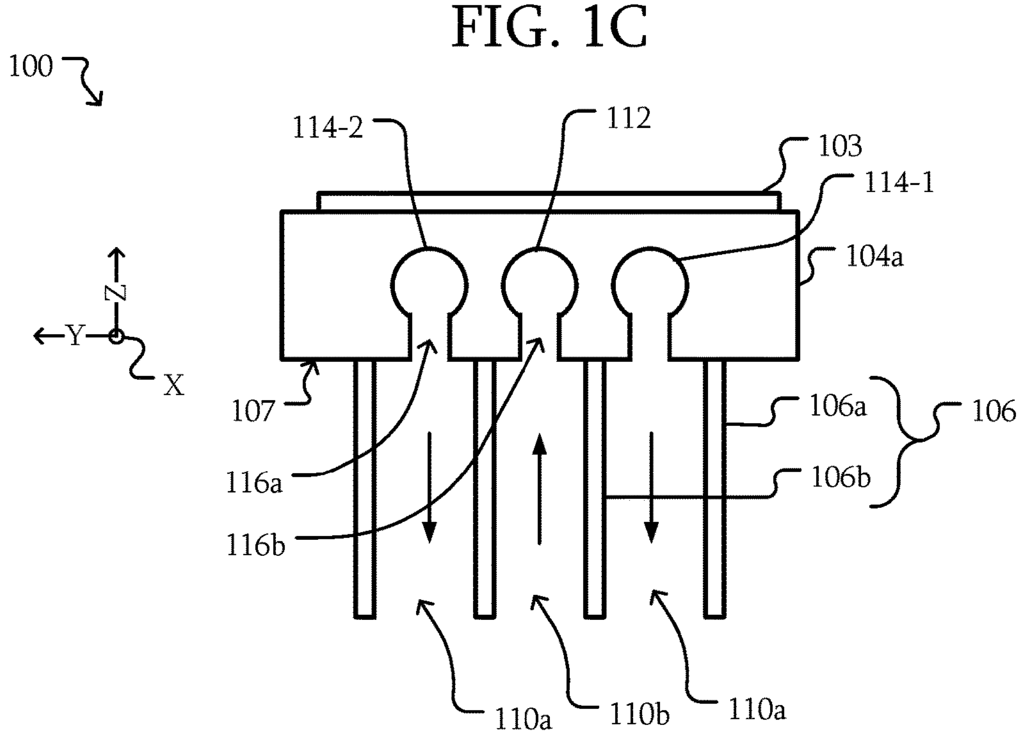
FIG. 1C is a cross-sectional view of the anode and the anode support structure of FIG. 1B according to some embodiments.
Figure 1D:
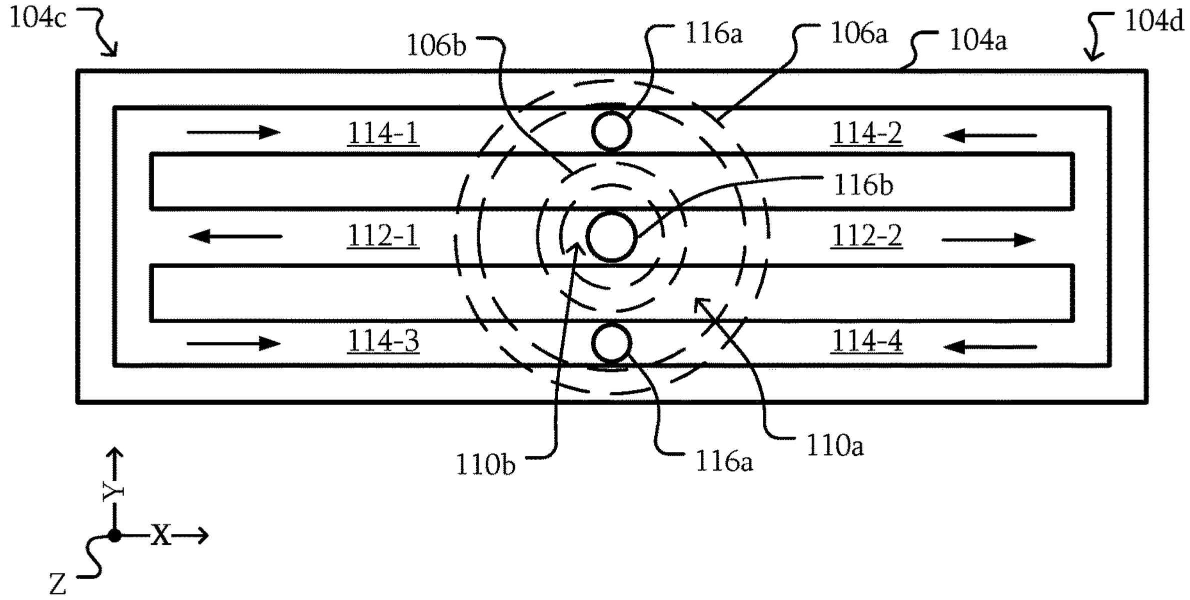
FIG. 1D is a cutaway view of the anode of FIG. 1A according to some embodiments.

FIG. 1A is an overhead view of an anode of an x-ray system according to some embodiments. FIG. 1B is a side view of the anode of FIG. 1A and an anode support structure according to some embodiments. FIG. 1C is a cross-sectional view of the anode and the anode support structure of FIG. 1B according to some embodiments. FIG. 1C is a cross-section along plane I parallel to the Y-Z plane. FIG. 1D is a cutaway view of the anode of FIG. 1A according to some embodiments. FIG. 1D is an overhead cutaway view along the plane II parallel to the X-Y plane.

Referring to FIGS. 1A-1D, in some embodiments, an x-ray system 100 includes a vacuum enclosure 201 configured to separate the vacuum 202 from a non-vacuum 204. The x-ray system 100 includes an anode 104 disposed in the vacuum enclosure 201. An anode support structure 106 penetrates the vacuum enclosure 201 and supports the anode 104 in the vacuum 202 within the vacuum enclosure 201.

The anode 104 includes a target 103. The target 103 is a structure configured to generate x-rays in response to one or more incident electron beams. The target 103 may include materials such as tungsten (W), molybdenum (Mo), rhodium (Rh), silver (Ag), rhenium (Re), palladium (Pd), alloys including such materials, or the like. In some embodiments, the target 103 is a linear target where the target length in the X direction is 5 times, 10 times, 20 times or more the target width in the Y direction. In some embodiments, the linear target may be flat or in a curve, such as a continuous curve, a piecewise-linear curve, a combination of such curves, or the like. In some embodiments, different electron beams may strike different regions 102 (represented by regions 102-1 to 102-*n*) of the target 103. In some embodiments, the electron beams may strike at least three, five, ten, one hundred, or more different regions 102 of the target 103. As will be described in further detail below, the target 103 may be a planar rather than linear target with different regions 102 extending in both the X and Y directions. In some embodiments, the target 103 may be a single target even when multiple electron beams are directed to multiple regions 102 on the target 103. In other embodiments, the target 103 may include multiple discrete targets attached to the anode 104. Any number of targets 103 may be disposed on the anode 104.

In some embodiments, the target 103 extends in a line and/or plane that is substantially perpendicular to the anode support structure 106. For example, the target 103 extends in a line along the X direction or in a plane along the X-Y plane. However, a major axis of the anode support structure 106 extends in the Z direction.

In some embodiments, the anode 104 includes multiple cooling passages 112 and 114. For example, the anode 104 may include cooling passages 112-1 to 112-2 and 114-1 to 114-4. In some embodiments, a body 104*a* of the anode 104 may be formed of a material having a higher heat conductivity than the target 103. For example, the body 104*a* of the anode 104 may be formed of copper, stainless steel, a vacuum compatible conductive material, or the like. The cooling passages 112 and 114 may be formed in a variety of ways as will be described in further detail below.

In some embodiments, the cooling passages 112 and 114 include cylindrical passages within the body 104*a* of the anode 104. Holes 116 such as holes 116*a* and 116*b* may be coupled to the cooling passages 112 and 114. Here, holes 116*a* are coupled to cooling passages 114 and hole 116*b* is coupled to cooling passages 112. The holes 116 may extend from an outer surface 107 on a side of the anode 104 opposite to the target 103 to the corresponding cooling passages 112 or 114. Although a number and placement of holes 116*a* and 116*b* are illustrated as an example, in other embodiments, the number and placement may be different. For example, rather than two holes 116*a*, four holes 116*a* may extend from the surface 107 to the cooling passages 114.

The anode support structure 106 may be formed of a variety of materials. For example, the anode support structure 106 may be formed of molybdenum (Mo), molybdenum alloys, copper (Cu), stainless steel, vacuum compatible conductive materials, or the like. The anode support structure 106 may be attached to the anode 104 in a variety of ways. For example, an outer wall 106*a* of the anode support structure 106 may be welded, brazed, or otherwise sealed to the anode 104 to maintain the vacuum 202 in the vacuum enclosure 201.

The anode support structure 106 may be coupled to the vacuum enclosure 201 in a variety of ways. For example, the anode 104 may be a hot anode configured to be at a high voltage potential of about 160 kilovolts (kV). Although 160 kV has been used as an example, in other embodiments, the anode voltage may be different. The anode support structure 106 may form the electrical connection to the anode 104. Thus, the anode support structure 106 or portions of the anode support structure 106 may be at the high voltage. Insulators, such as a ceramic insulator, may insulate the anode support structure from a housing of the vacuum enclosure.

The anode support structure 106 includes multiple cooling passages 110. In this example, the anode support structure 106 includes two cooling passages 110*a* and 110*b*. The cooling passages 110 are coupled to the cooling passages 112 and 114. Here, cooling passages 112 are coupled to the cooling passage 116*b* through hole 116*b* and cooling passages 114 are coupled to the cooling passages 114 through holes 116*a*.

In some embodiments, coolant is directed into the anode support structure 106 as illustrated by the arrows in cooling channels 110. That is the coolant enters the cooling passage 110*b* of the anode support structure 106. The coolant passes through hole 116*b* into cooling passages 112. The coolant is split between cooling passages 112-1 and 112-2. The coolant travels towards the opposite ends 104*c* and 104*d* of the body 104 of the anode 104. At the ends 104*c* and 104*d* of the anode 104, the flow of the coolant is reversed to travel back through cooling passages 114. The coolant that passed through cooling passage 112-1 is divided between cooling passages 114-1 and 114-3. Similarly, the coolant that passed through the cooling passage 112-2 is divided between cooling passages 114-2 and 114-4. The coolant passing through the cooling passages 114 returns to the anode support structure 106 through holes 116*a* that lead to the cooling passage 110*a*.

In some embodiments, a result of this path of the coolant results in a more uniform cooling. For example, an amount of heat generated by incident electron beams on the target 103 may be concentrated on a centerline in the X direction along the center of the target 103. In some embodiments, the cooling passages 112 are disposed on a plane parallel to the X-Z plane and parallel to the centerline of the target 103. In other embodiments, the cooling passages 112 may be the closest cooling passages to the centerline of the target 103. That is, the heat may be higher closest to cooling passages 112. As the coolant enters cooling passages 112 before cooling passages 114, a greater amount of heat may be transferred to the coolant from the regions of the target 103 that generate the greater heat. The warmer coolant may pass through cooling passages 114 disposed on opposite sides of the cooling passages 112. The cooling passages 114 may receive less heat as a smaller amount of heat may be generated above cooling passages 114 than cooling passages 112. As a result, the amount of cooling provided to the target 103 may better match the heat generated on the target 103.

Although a particular number of cooling passages 112 and 114 are used as an example, in other embodiments, the number of cooling passages 112 and/or 114 may be different. In some embodiments, rather than four return cooling passages 114-1 to 114-4, any number from one may be used. For example, eight return cooling passages 114 may be used where the coolant is divided at each of the ends into four cooling passages 114.

In some embodiments, the cooling passages 110 are coaxial. For example, the cooling passage 110*b* may be in the center of the cooling passage 110*a*. The cooling passages 110*a* and 110*b* may be formed by two coaxial pipes forming the outer wall 106*a* and inner wall 106*b*.

In some embodiments, the anode support structure 106 is coupled to the anode 104 in a center of the base 104*a* of the anode 104, such as within 10% of the length along the X direction from center of the base 104*a*. In some embodiments, the anode support structure 106 may be coupled to the anode 104 at a location between 25% and 75% of the length of the anode 104 along the X direction or the longest dimension of the base 104*a*. The anode support structure 106 may be coupled to a side of the anode 104 that is opposite to the target 103. In some embodiments, having the anode support structure 106 disposed with respect to the center may reduce deflection. For example, the distance from the anode support structure 106 to an unsupported end of the anode 104 may be less than if the anode 104 was supported at an end of the anode. As a result, any resulting deflection may be smaller. While coupling the anode support structure 106 to the anode 104 in the center or relative to the center has been used as an example, in other embodiments, the anode support structure 106 may be offset from the center. In some embodiments, the anode 104 may be a linear anode have an aspect ratio X:Y in the X direction (length) and Y direction (width) that is greater than or equal to 4:1, 10:1, 25:1, 50:1, and/or 100:1. In some embodiments, the anode 104 may be a linear anode have an aspect ratio X:Z in the X direction (length) and Z direction (height) that is greater than or equal to 4:1, 10:1, 25:1, 50:1, and/or 100:1. In some embodiments, the target 103 may be rectangular with an aspect ratio X:Y in the X direction (length) and Y direction (width) that is greater than or equal to 4:1, 10:1, 25:1, 50:1, and/or 100:1.

In some embodiments, the placement of the anode support structure 106 on the opposite side of the anode 104 from the target 104 allows for the width of the system 100 to be reduced. In particular, standoffs, feedthroughs, or the like that would have used space on the ends of the anode 104 are replaced by the anode support structure 106. As a result, a wall of the vacuum enclosure 201 may be disposed closer to the anode 104, reducing the dimension of the system in the X direction. In some embodiments, when multiple x-ray systems 100 are placed next to each other in the X direction, an amount of space between the anodes 104 of the x-ray systems 100 may be reduced, reducing a gap between the x-rays generated by the x-ray systems 100.

In some embodiments, multiple high voltage standoffs may be eliminated. For example, to support an anode on the ends 104*c* and 104*d*, high voltage standoffs on both ends 104*c* and 104*d* may be used. However, the anode support structure 106 replaces both of the high voltage standoffs, reducing part counts, complexity, or the like.

In addition, the placement of the anode support structure 106 on the opposite side of the anode 104 from the target 103 may reduce a failure rate of the x-ray system 100. High voltage instability is a failure mechanism that can increase with more high voltage standoffs. High voltage instability may limit the lifetime of an x-ray system 100. Arcing across an insulator due to scattered electrons from the anode 104 may increase a chance of such failures. When high voltage standoffs are used on the ends 104*c* and 104*d* of the anode 104, electrons that travel laterally along the anode 104 are more likely to build up on the high voltage standoffs. In contrast, when the anode 104 is supported by the anode support structure 106 on the opposite side of the target 103, scattered electrons that may reach an insulator coupled to the anode support structure 106 may be reduced or eliminated, reducing or eliminating a probability of arcing.

In addition, the complexity of the support for the anode 104 may be reduced. If the anode 104 was supported on the ends, the high voltage standoffs may need a type of structure that can accommodate axial expansion in the X direction due to temperature changes. The triple points formed by such structures may need to be shielded. However, by placing the anode support structure 106 on the opposite side of the target 103, a structure to accommodate axial expansion and/or additional shielding for triple points may not be needed.

In some embodiments, the structure of the anode support structure 106 and the anode 104 may simplify manufacturing and/or assembly of the x-ray system 100. When mounting the anode 104 on the anode support structure 106 as described above, connections to the cooling channels 112 and 114 may be simplified. For example, if the anode 104 had concentric cooling passages within the body 104*a*, a connection to the concentric cooling passages and, in particular, the central cooling passage, may be difficult. That is, a center tube, which may be free floating, may have the ability to rotate and have a somewhat thin wall. Sealing a tube to such a structure may be difficult. However, as the cooling passages 112 and 114 are not concentric, the holes 116*a* and 116*b* do not pass through another cooling passage to reach the intended cooling passage.

Although the anode support structure 106 is illustrated as being coupled to the anode 104 such that the anode support structure 106 is perpendicular to the target 103, in other embodiments, the orientation of the anode support structure 106 and the target 103 and/or anode 104 may be different. For example, the connection of the anode support structure 106 to the anode 104, the structure of the body of the anode 104, or the like may be different such that the target 103 is rotated about the X direction by a non-zero angle such as 5, 10, 15, or 20 degrees, or the like.

Figure 2:
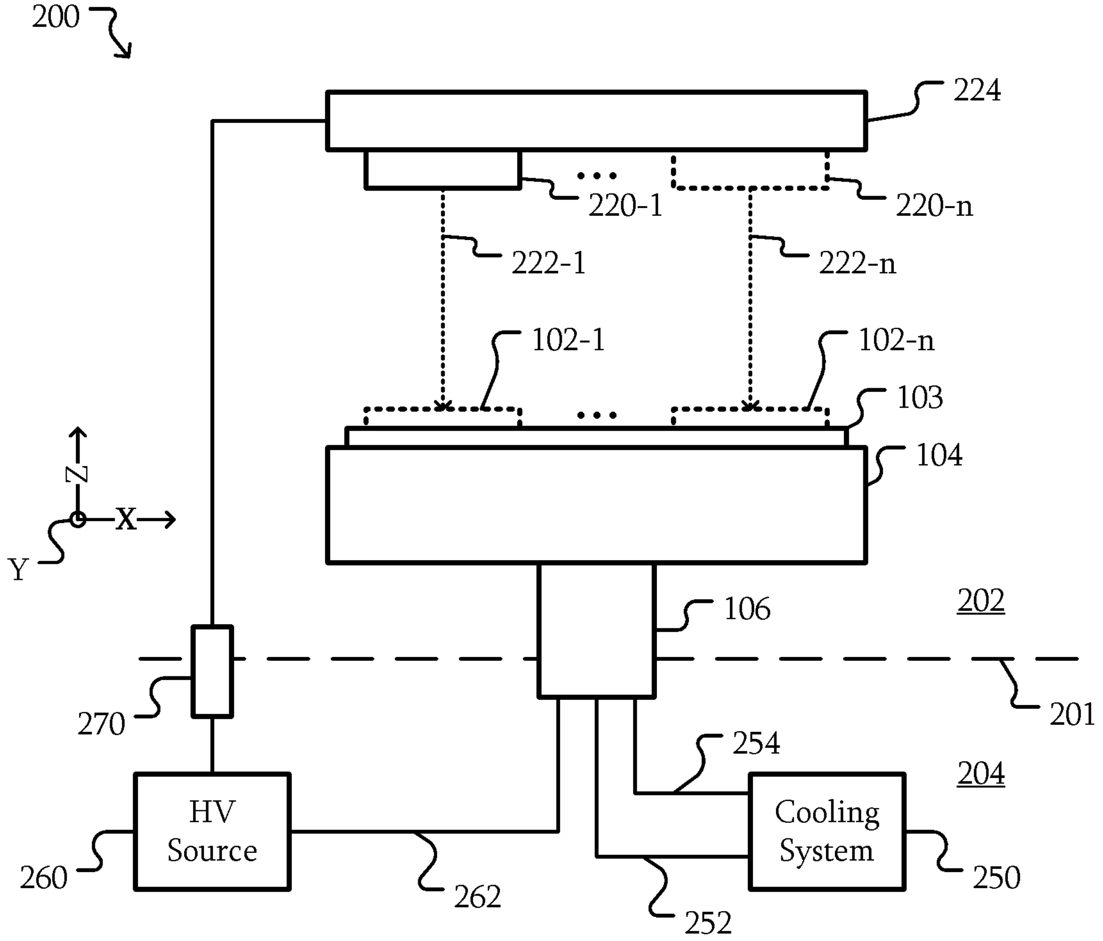
FIG. 2 is a block diagrams of an x-ray system according to some embodiments.

FIG. 2 is a block diagrams of an x-ray system according to some embodiments. The x-ray system 200 may be similar to the x-ray system 100 described above, including similar components. The x-ray system 200 includes a cathode 224 including one or more emitters 220 disposed within the vacuum enclosure 201. Here, multiple emitters 220-1 to 220-*n* are illustrated as an example. The emitters are configured to generate corresponding electron beams 222-1 to 222-*n*.

The emitters 220 may be any variety of emitters. For example, each of the emitters 220 may include a filament (e.g., coil filament emitter), a low work function (LWF) emitter, a field emitter (e.g., including nanotubes), a dispenser cathode, a photo emitter, or the like. The emitters 220 may be the same or different types of emitters. For example, one or more of the emitters 220 may be field emitters while one or more other emitters 220 may be filaments.

The x-ray system 200 includes a cooling system 250. The cooling system 250 may include any system configured to supply coolant to the anode 104 through the anode support structure 106. For example, the cooling system 250 may include pumps, radiators, refrigerators, reservoirs, or the like. The cooling system 250 may be coupled to the anode support structure 106 through supply 252 and return 254 coolant lines. Through the coolant lines 252 and 254, a coolant such as water, glycol, dielectric oil, non-conductive liquids, or the like may be circulated through the anode 104.

In some embodiments, the x-ray system 200 includes a high voltage (HV) source 260 disposed outside of the vacuum enclosure 201. The high voltage source 260 may be configured to generate one or more high voltages for operation of the x-ray system 200. For example, the high voltage source 260 may be configured to generate voltages from tens kV to over 100 kV or more.

Electrical connections to components within the vacuum enclosure 201 may be formed through the anode support structure 106 to the anode 104. For example, a high voltage connection 262 is illustrated as connected from the high voltage source 260 to the support structure 106 to supply the anode voltage. A feedthrough 270 may also provide an electrical connection to the cathode 224 if the cathode is not grounded.

In some embodiments, the only electrical connection to the anode 104 maybe formed through a single anode support structure 106. In some embodiments, the only structural support for the anode 104 in the vacuum enclosure 201 may be from a single anode support structure 106. In some embodiments, the only electrical connection to the anode 104 and the only structural support for the anode 104 may be from a single anode support structure 106.

Figure 3A:
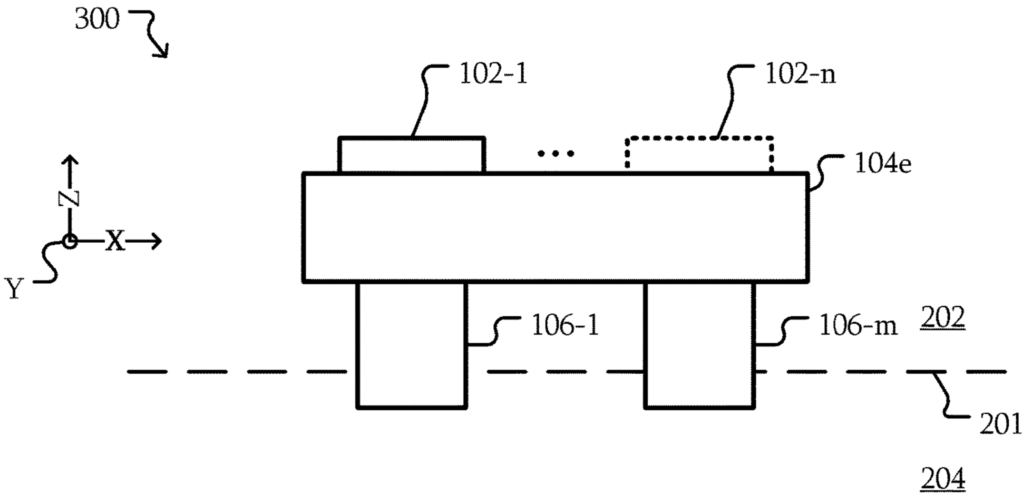
FIG. 3A is a block diagrams of an x-ray system with multiple anode support structures according to some embodiments.

FIG. 3A is a block diagrams of an x-ray system with multiple anode support structures according to some embodiments. The x-ray system 300 may be similar to the x-ray systems 100 and/or 200 described above. However, the x-ray system 300 includes multiple anode support structures 106-1 to 106-*m*, each of which penetrates the vacuum enclosure. Each of the anode support structures 106-1 to 106-*m* may be coupled to the anode 104 similar to the single anode support structure 106 described above.

In some embodiments, one of the anode support structures 106 is configured to supply and return coolant while another anode support structures 106 is configured to supply an electrical connection. In other embodiments, one of the anode support structures 106 is configured to supply coolant while another one of the anode support structures 106 is configured to return coolant. In some embodiments, coolant may be supplied and returned through more than one or all of the support structures 106. In a particular example, one coolant path may enter the anode 104 through the anode support structure 106-1 and exit through a different anode support structure 106-*m*. A second coolant path may enter the anode 104 through the anode support structure 106-*m* and exit through the anode support structure 106-1.

Figure 3B:
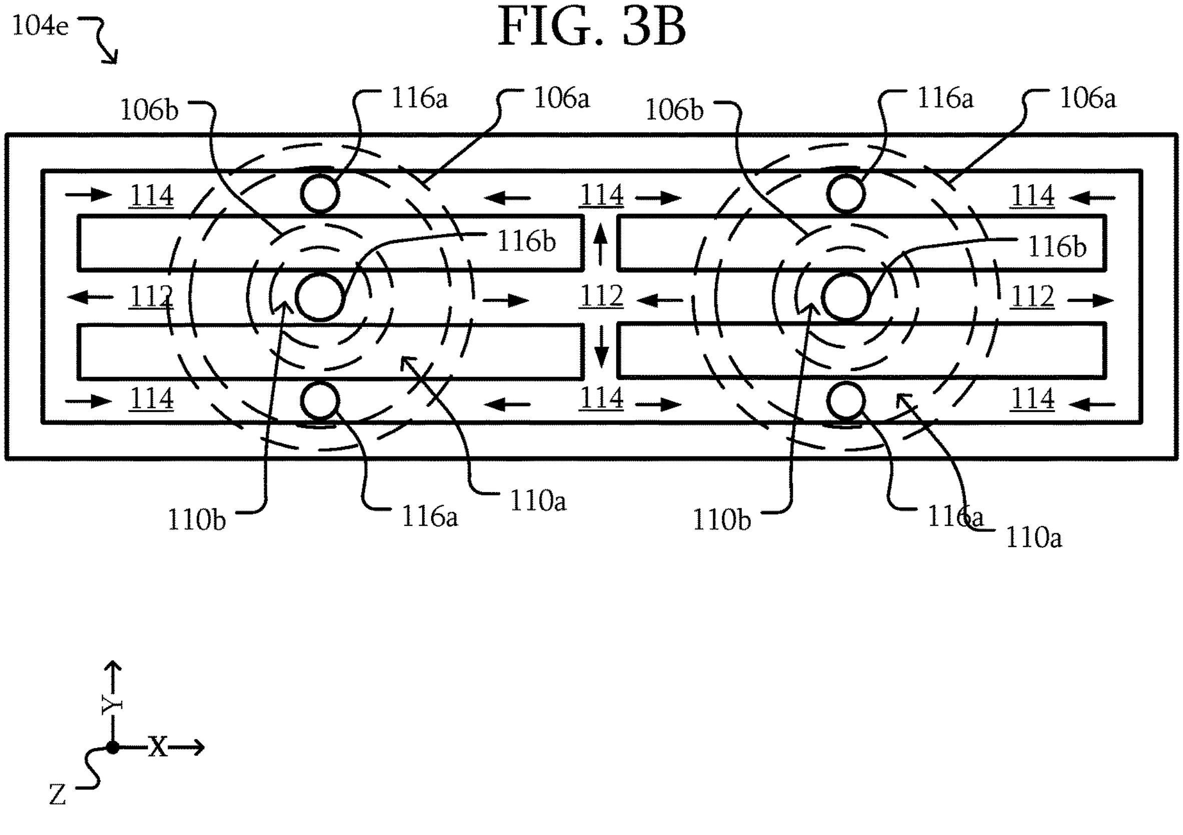
FIG. 3B is a cutaway view of the anode of FIG. 3A according to some embodiments.

FIG. 3B is a cutaway view of the anode of FIG. 3A according to some embodiments. In some embodiments, each of the anode support structures 106-1 to 106-*m* includes cooling passages 110*a* and 110*b* coupled to openings 116*a* and 116*b*. Multiple cooling passages 112 and 114 may be present to guide the coolant around the anode 104*e*. In this example, the arrows illustrate a direction of flow of the coolant. In some embodiments, the coolant may flow towards a center of the anode 104*e* through cooling passages 112 before being guided to the cooling passages 114 in a manner similar to the ends of the anode 104*e*. While each anode support structures 106-1 to 106-*m* is used as an example, in other embodiments, less than all to one of the anode support structures 106-1 to 106-*m* may include cooling passages 110 associated with structures in the anode 104*e*.

Figure 4A:
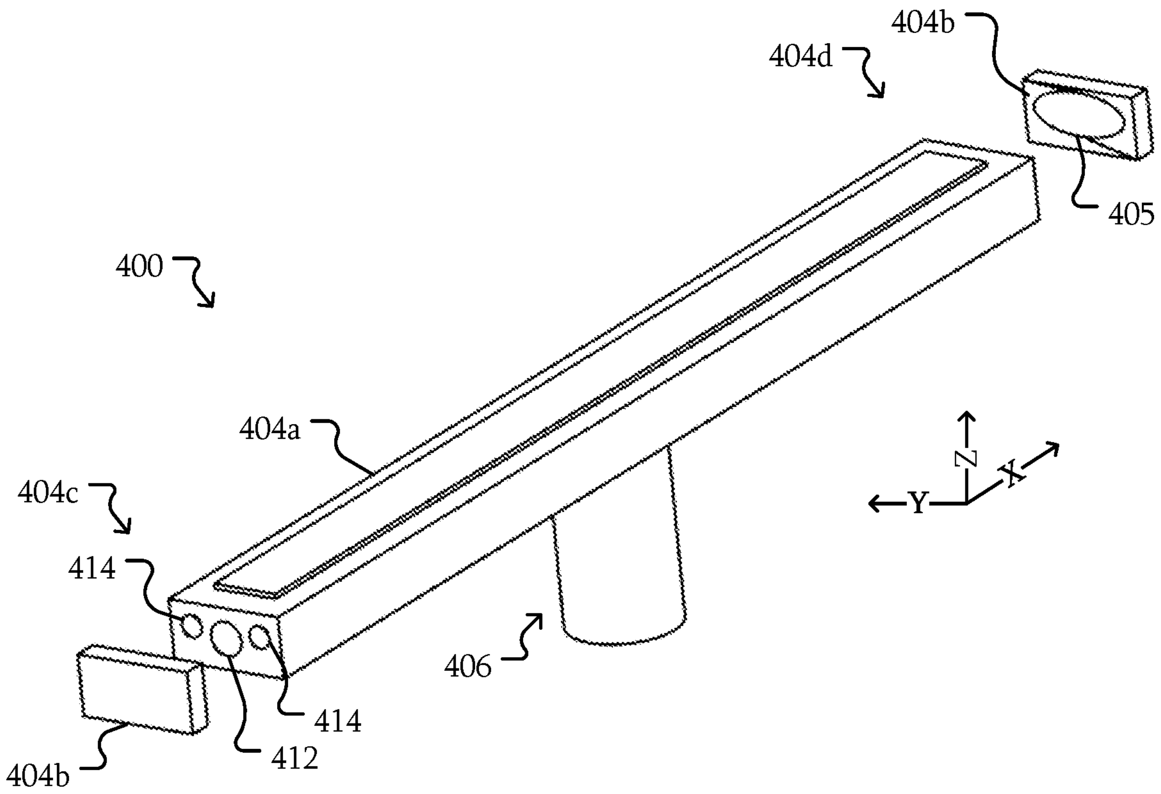
FIG. 4A is an exploded perspective view of an anode and anode support structure according to some embodiments.

FIG. 4A is an exploded perspective view of an anode and anode support structure according to some embodiments. The x-ray system 400 may be similar to the x-ray systems 100, 200, and/or 300 described above. The anode 404 may be similar to the anodes 104 described above and be coupled to an anode support structure 406 similar to the anode support structure 106. These structures may be disposed in similar configurations. The anode 404 includes a body 404*a* and end caps 404*b*. The target 403 may be disposed on the base 404*a*. The body 404*a* may include multiple cooling passages 412 and 414. The cooling passages 412 and 414 may be bores formed through the body 404*a*. The bores may extend through the body from the end 404*c* to the opposite end 404*d*.

End caps 404*b* may be disposed on the opposite ends 404*c* and 404*d* of the body 404*a*. The end caps 404*b* may each couple together the cooling passages 412 and 414. For example, the end caps 404*b* may each include a depression 405 that extends across the openings of the cooling passages 412 and 414 at the ends 404*c* and 404*d*. Thus, coolant may flow, for example, from the cooling passage 412 into the depression 405 and then into the cooling passages 414. While a particular structure on the end caps 404*b* has been used as an example, other structures may be used such that the end caps 404*b* couple together at least in part the cooling passages 412 and 414. For example, the body 404*a* may include a depression (not illustrated) connecting the cooling passages 412 and 414. The end caps 404*b* may include a flat surface that seals the cooling passages 412 and 414. In other embodiments, the forming of the cooling passages may include a combination of structures of the body 404*a* and the end caps 404*b*.

The end caps 404*b* may be attached to the body 404*a* in a variety of ways. For example, the end caps 404*b* may be brazed, welded, and/or sealed in a vacuum compatible manner to the body 404*a*.

Figure 4B:
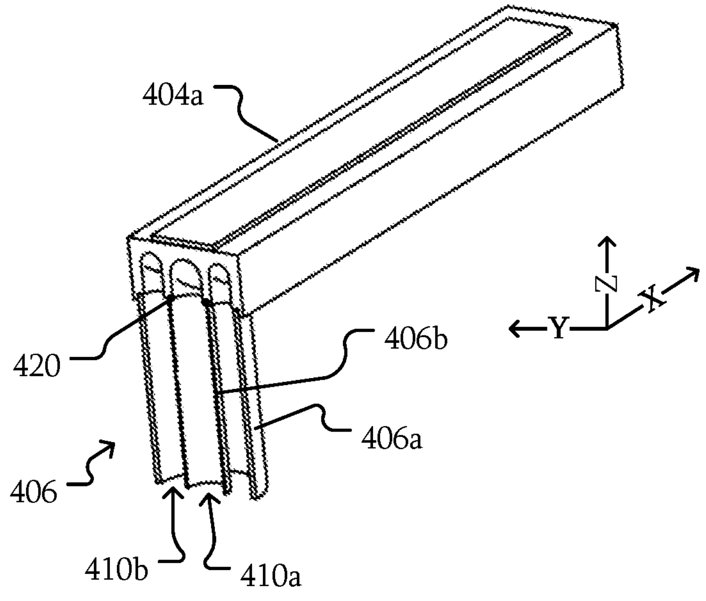
FIG. 4B is a cutaway view of the anode and the anode support structure of FIG. 4A according to some embodiments.
Figure 4C:
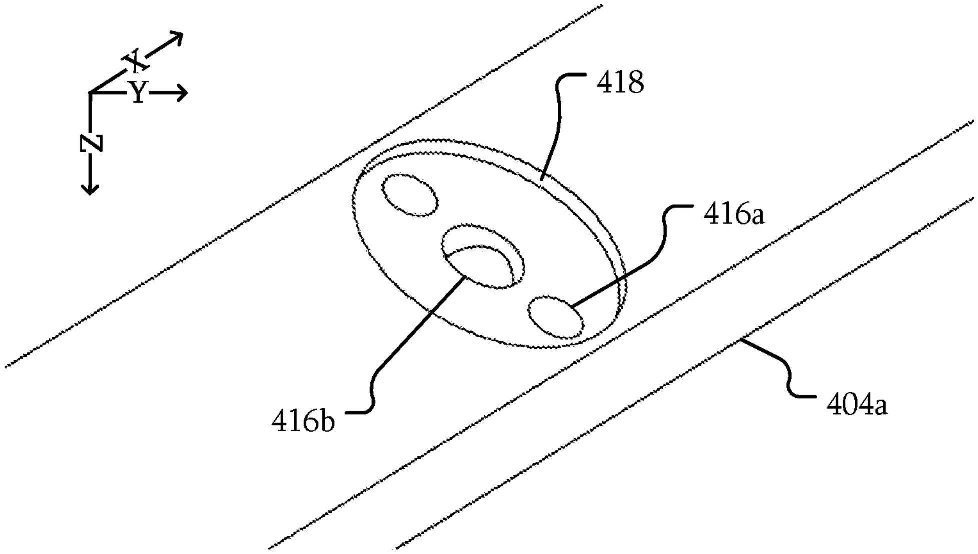
FIG. 4C is a perspective view of the anode without the anode support structure according to some embodiments.

FIG. 4B is a cutaway view of the anode 404 and the anode support structure 406 of FIG. 4A according to some embodiments. FIG. 4C is a perspective view of the anode 404 without the anode support structure 406 according to some embodiments. Referring to FIGS. 4A-4C, the anode support structure 406 is coupled to the base 404*a* at a center of the base 404*a*. In some embodiments, the outer wall 406*a* is attached to an opening 418 in the body 404*a* of the anode 404. As described above, the outer wall 406*a* may be brazed, welded, and/or sealed in a vacuum compatible manner to the body 404*a*. In some embodiments, the outer wall 406 may be conductive and may form an electrical connection to the anode 404 and target 403.

In some embodiments, the cooling passages 412 and 414 extend from the anode support structure 406 to the opposite ends 404*c* and 404*d* of the base 404*a*.

The inner wall 406*b* may include a tube that is coaxial with the outer wall 406*a*. As a result, the cooling passages 410*a* and 410*b* are coaxial. However, in other embodiments, the cooling passages 410*a* and 410*b* may not be coaxial.

In some embodiments, the inner wall 406*b* may be inserted into the hole 416*b*. The inner wall 406*b* may be a conductive structure. An o-ring 420 or other sealing technique may be used to seal the inner wall 406*b* to the body 404*a*. The o-ring 420 may create a seal between the cooling passages 410*a* and 410*b* and the corresponding paths for the coolant. The o-ring 420 or similar structure may be non-conductive. In some embodiments, additional structures, such as a conductive spring, may be used to electrically connect the inner wall 406*b* to the body 404*a*. Thus, an electrical connection to the anode 404 and target 403 may be formed using the inner wall 406*b* in addition to or as an alternative to the outer wall 406*a*.

In some embodiments, the cross-sectional area of the combination of the cooling passages 414 is greater than the cross-sectional area of the combination of the cooling passages 412. As a result, the head loss through the cooling passages 412 and 414 may be reduced.

As described above, the manufacture of the cooling passages may be less complex and costly as using a coaxial tube within the body 404*a*. For example, attempting to make a connection to a coaxial tube within the body 404*a* may be difficult to align an inlet tube with the coaxial tube within the body 404*a*. However, as the cooling passages 412 and 414 are not coaxial in the body 404*a*, the connections to the cooling passages 412 and 414 from the anode support structure 406 may be easier. For example, in some embodiments, holes 416*a* and 416*b* may be drilled in the body 404*a* to connect to the cooling passages 412 and 414. In some embodiments, non-coaxial cooling passages may provide more surface area of the body 404*a* for coolant to contact.

Figure 4D:
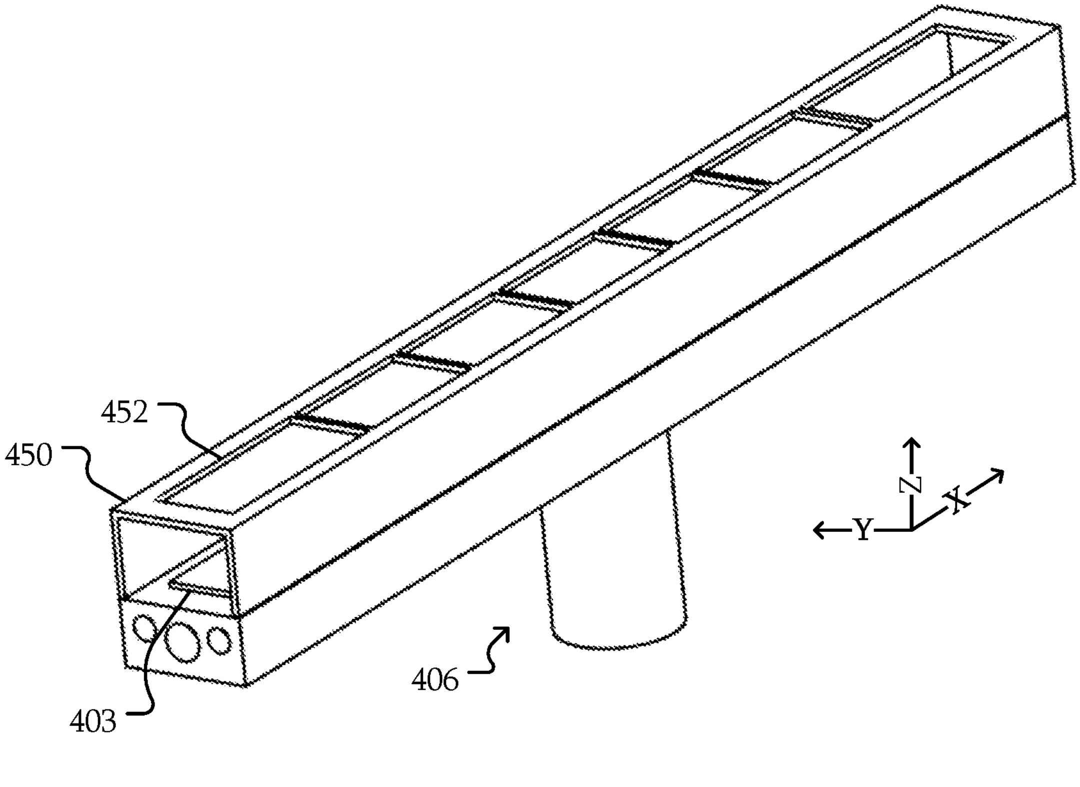
FIG. 4D is a perspective view of an anode of FIG. 4A with a shroud according to some embodiments.

FIG. 4D is a perspective view of an anode of FIG. 4A with a shroud according to some embodiments. Referring to FIGS. 4A and 4D, in some embodiments, the anode 404 may include a shroud 450. The shroud 450 may include an electrically conductive structure with openings 452. The openings 452 may permit incoming electrons from one or more electron beams. However, the shroud 450 may collect backscattered electrons scattering from the target 403 and prevent those backscattered electrons from striking or damaging other features of the x-ray tube, like the emitters, insulators, windows, or the like.

In some embodiments, the shroud 450 may be supported at least in part by the end caps 404*b*. For example, the end caps 404*b* may include a groove, slot, or other structure to connect the ends of the shroud 450 to the base 404*a*. Accordingly, the end caps 404*b* may both redirect the coolant at the ends 404*c* and 404*d* and support the shroud 450.

Figure 5A:
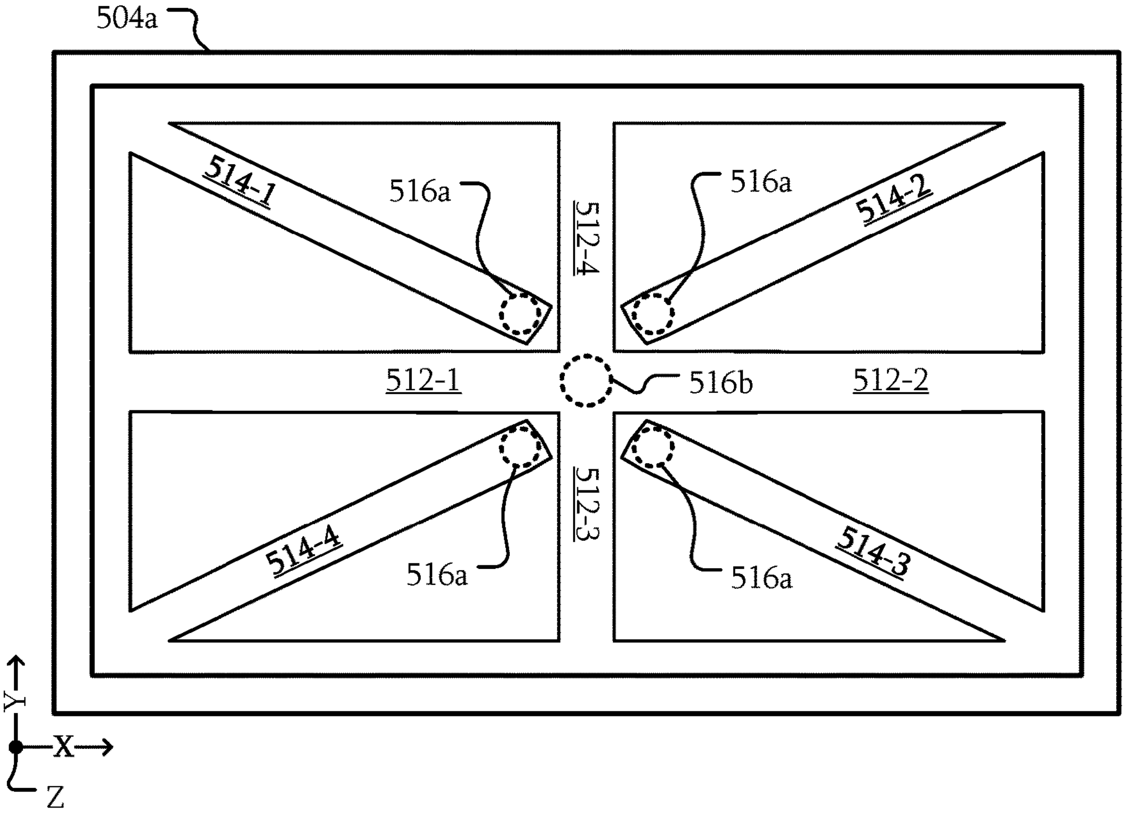
FIG. 5A is a cutaway view of an anode according to some embodiments.
Figure 5B:
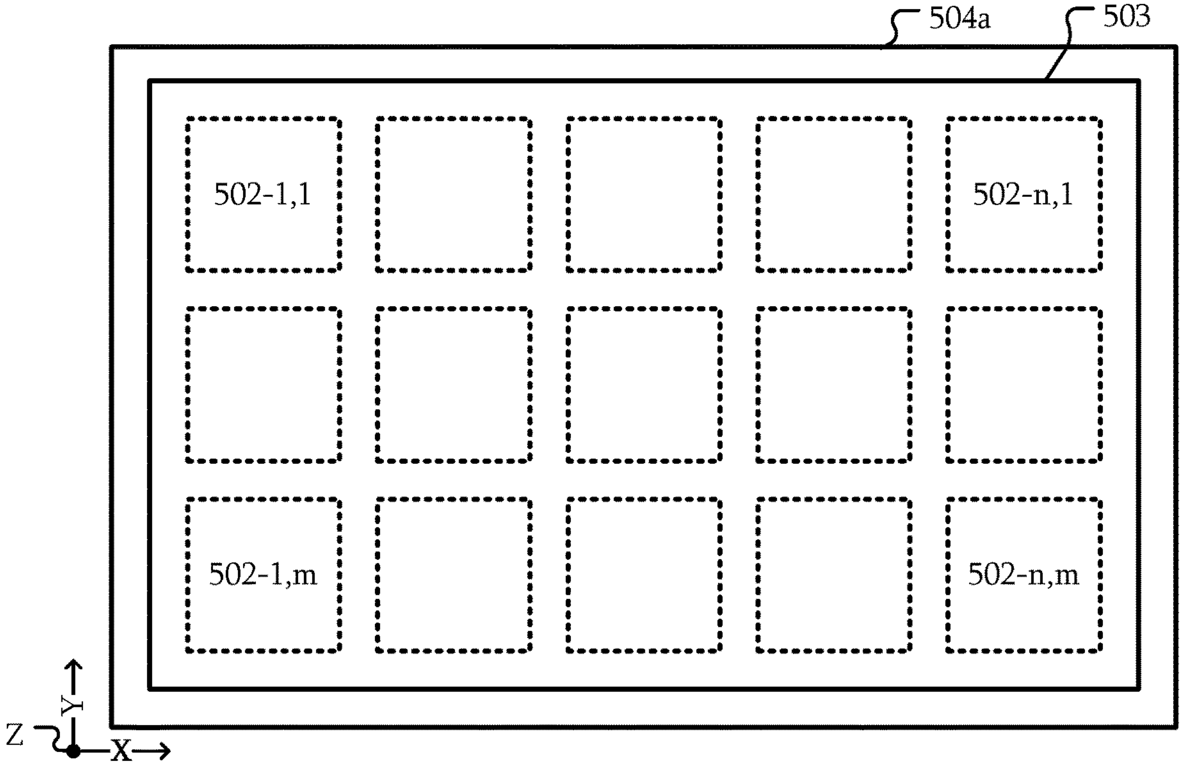
FIG. 5B is an overhead view of an anode according to some embodiments.

FIG. 5A is a cutaway view of an anode according to some embodiments. The anode 504 may be similar to the anodes 104 and 404 described above. FIG. 5B is an overhead view of an anode according to some embodiments. Referring to FIGS. 5A and 5B, in some embodiments, the anode 504 may include two-dimensional array of regions 502 for multiple electron beams. For example, the target 503 may include an n×m array of regions 502 on the target 503 for electron beams. Both n and m may be integers greater than 1.

As the regions 502 may extend in the X and Y directions, the cooling passages 512 and 514 within the body 504*a* may extend in directions other than along the X direction. In this example, the cooling passages 112 extend in both the X and Y directions and the cooling passages 114 may extend diagonally in the X-Y plane. Coolant may be supplied, for example, through the hole 516*b* and split among cooling passages 512-1 to 512-4. The coolant may be returned through cooling passages 514-1 to 514-4 and holes 516*a*.

Figure 6A:
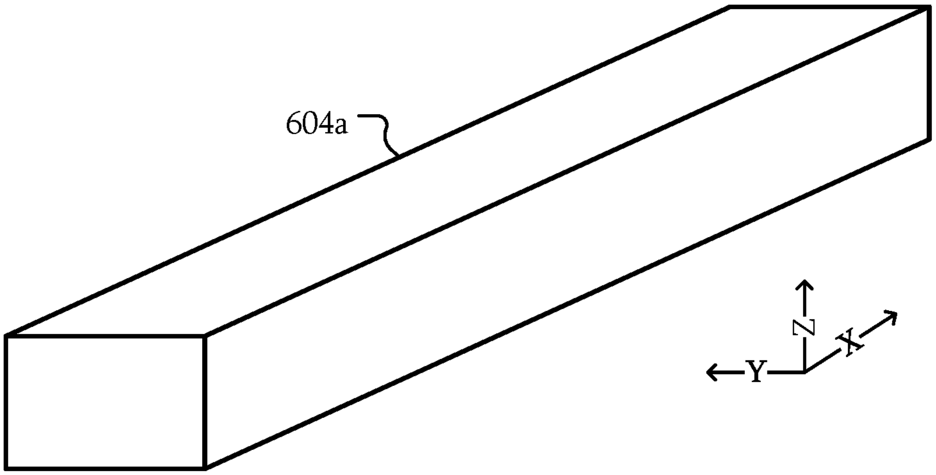
FIGS. 6A-6G are block diagrams of a technique of forming an x-ray system according to some embodiments.
Figure 6B:
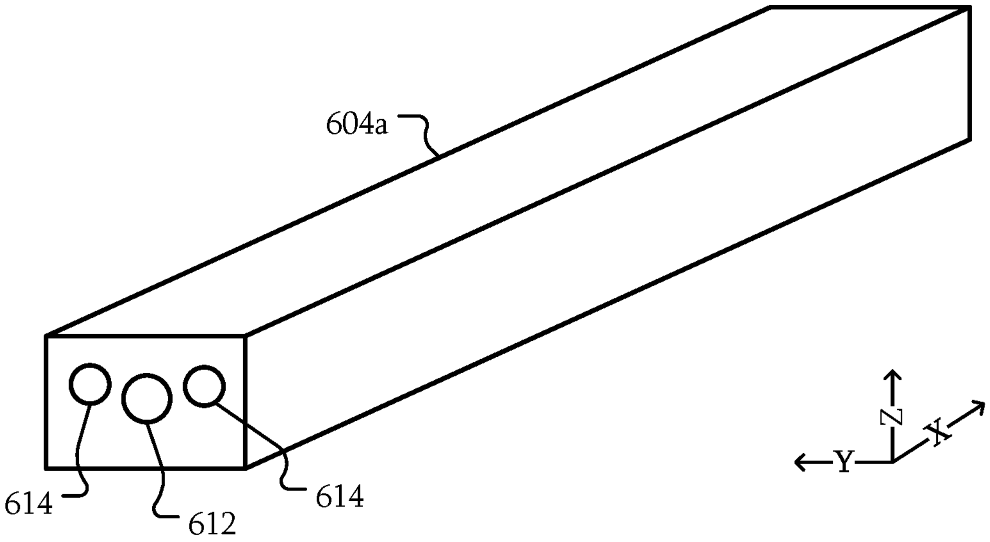

FIGS. 6A-6G are block diagrams of a technique of forming an x-ray system according to some embodiments. Referring to FIG. 6A, a base 604*a* is provided. In FIG. 6B, multiple cooling passages are formed in the base 604*a*. For example, cooling passages 612 and 614 may be formed by drilling through the base 604*a* such that each of the cooling passages 612 and 614 extends at least partially through the base 604.

Figure 6C:
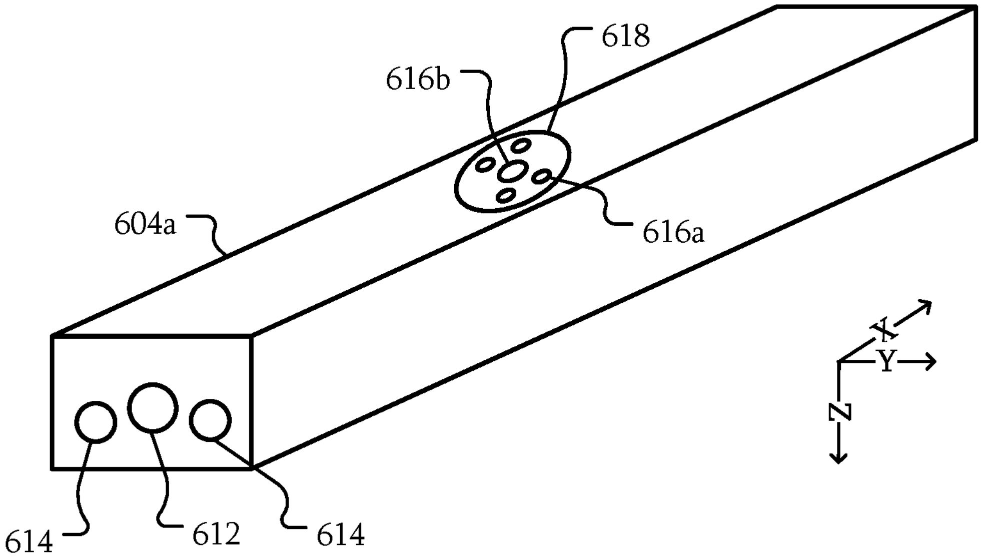

Referring to FIG. 6C, holes 616*a* and 616*b* may be drilled in the body 604*a* and an opening 618 may be formed. For example, the opening 618 may be machined in the surface of the body 604*a*. The opening 618 may be configured to receive and/or mate with a particular anode support structure (not illustrated). Holes 616*a* and 616*b* may be drilled to extend into the cooling passages 612 and 614. Thus, the cooling passages 612 and 614 may be exposed.

Figure 6D:
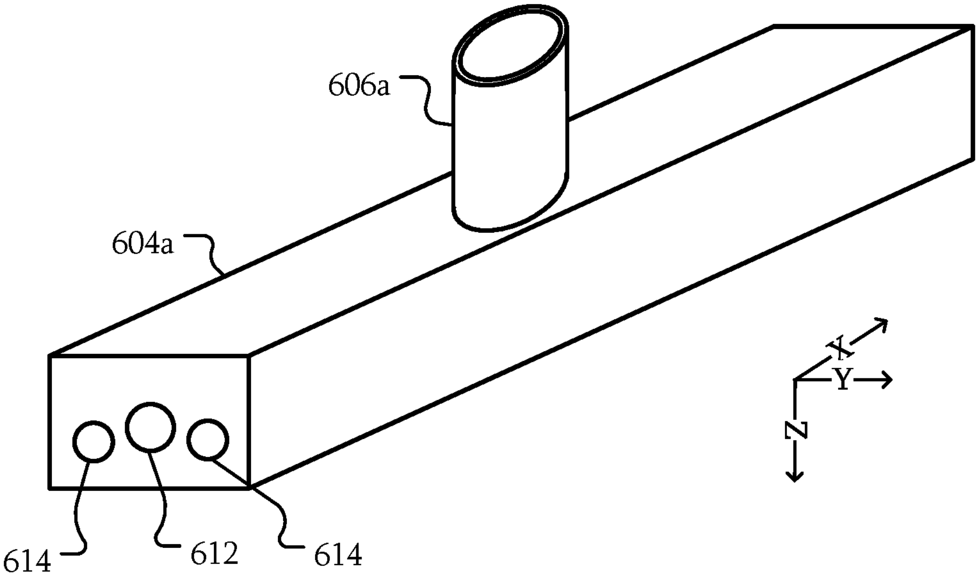
Figure 6E:
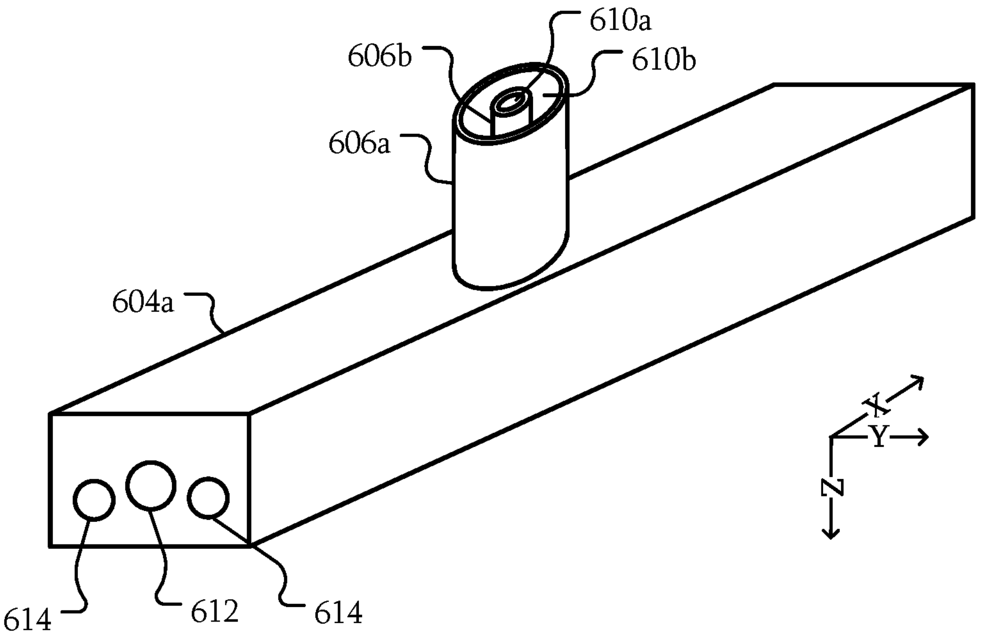

Referring to FIGS. 6D and 6E, the anode support structure 606 may be attached to the base 604*a*. For example, the anode support structure 606 may be provided with multiple cooling passages 610, such as an outer cooling passage 610*b* and an inner cooling passage 610*a*. The anode support structure 606 may be attached by first attaching the outer wall 606*a* to the base 604*a* at the opening 618. as described above, the outer wall 606*a* may be attached by welding, brazing, and/or any vacuum compatible sealing technique. The inner wall 606*b* may then be inserted into the hole 616*b*. In some embodiments, inserting the inner wall 606*b* into the hole 616*b* may include placing a spring, o-ring, or the like as described above on the inner wall 606*b* and/or in the hole 616*b*. As a result, the cooling passages 610 of the anode support structure 606 may be formed and those cooling passages 610 may be coupled to the cooling passages 612 and 614.

Figure 6F:
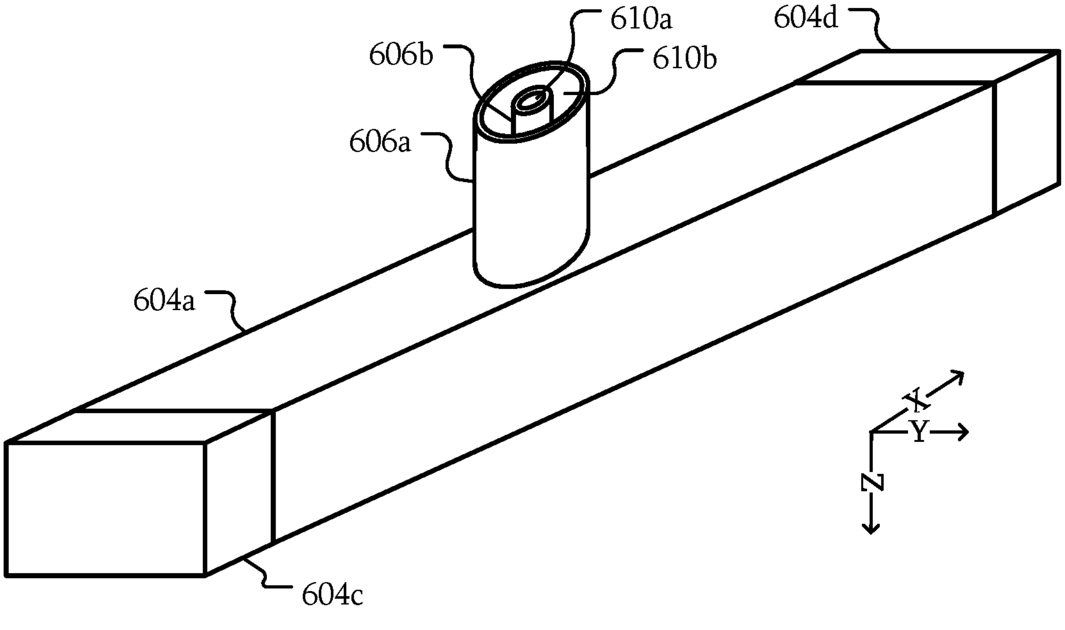

Referring to FIG. 6F, in some embodiments, end caps 604*c* and 604*d* may be attached to the base 604*a*. As described above, the end caps 604*c* and 604*d* may be attached by welding, brazing, or by any vacuum compatible sealing technique. As a result, the cooling passages 612 and 614 may be coupled together. In some embodiments, the attachment may complete the formation of the cooling passages within the base 604*a*.

Figure 6G:
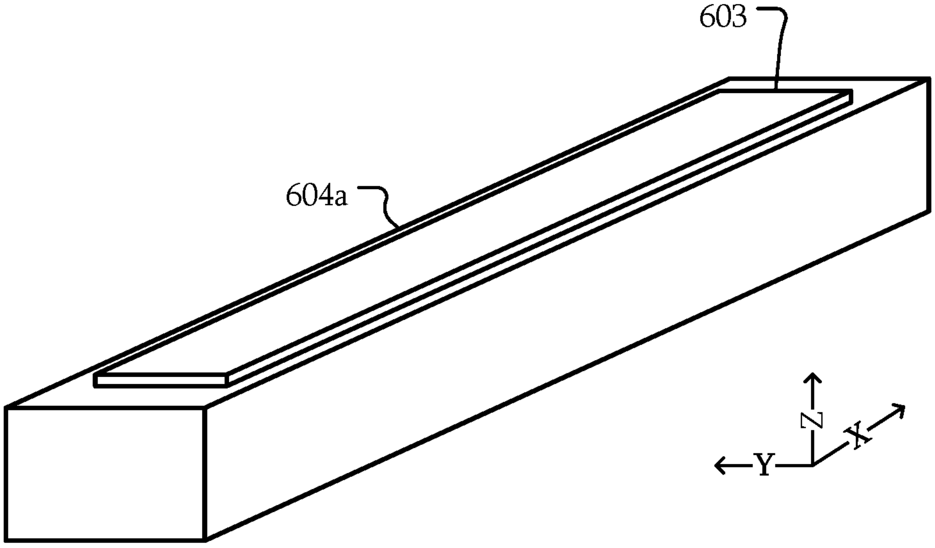

Referring to FIG. 6G, in some embodiments, the target 603 may be formed on the base 604*a* as illustrated in FIG. 6A before cooling passages 112 and 114 are formed in the based 604*a*. However, in other embodiments, the target 603 may be formed on the base 604*a* at a different point in forming the anode 604.

Although a particular sequence of operations has been described above to form an x-ray system, in other embodiments, the sequence may be different.

Figure 7:
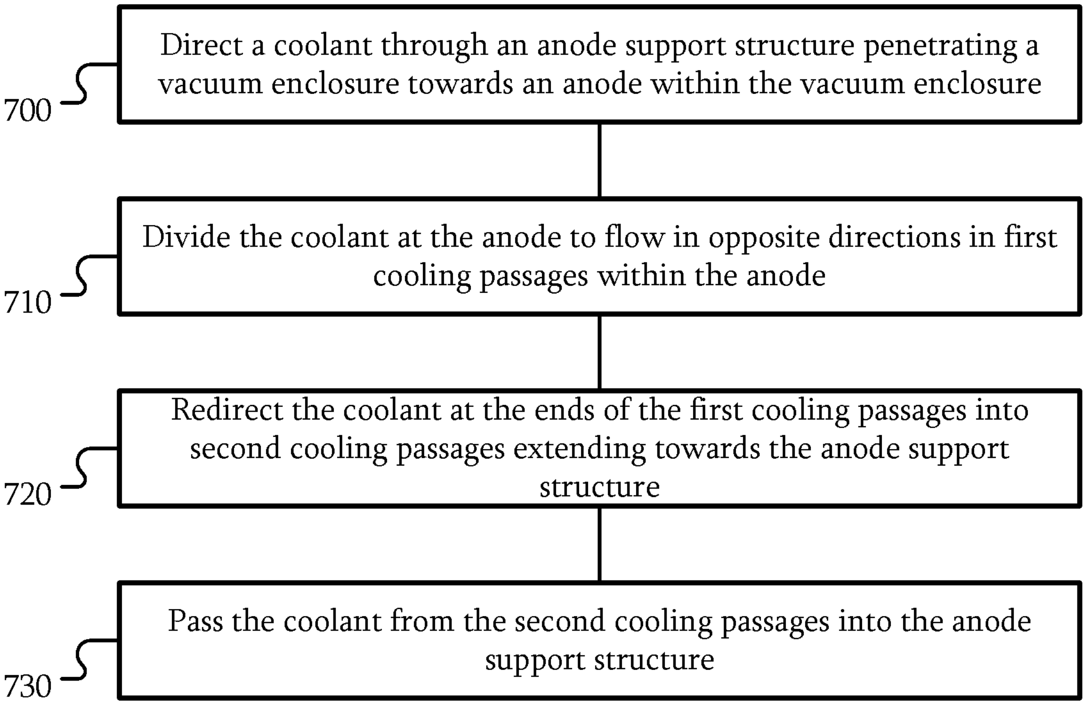
FIG. 7 is a flowchart of a technique of operating an anode of an x-ray system according to some embodiments.

FIG. 7 is a flowchart of a technique of operating an anode of an x-ray system according to some embodiments. Referring to FIGS. 1A-1D and 7, the x-ray system 100 will be used as an example; however, in other embodiments, the operations may be used with other x-ray systems described herein. In some embodiments, in 700 a coolant is directed through an anode support structure 106 penetrating a vacuum enclosure 201 towards an anode 104 within the vacuum enclosure 201. For example, coolant may be directed through cooling passages 110*a* or 110*b*. In some embodiments, the coolant may be supplied from a cooling system 250 as illustrated in FIG. 2.

In 710, the coolant is divided at the anode to flow in opposite directions in first cooling passages within the anode. For example, the coolant is divided to flow towards both ends 104*c* and 104*d*.

In 720, the coolant is redirected at the ends of the first cooling passages into second cooling passages extending towards the anode support structure. For example, the coolant may be redirected by a structure at the ends 104*c* and 104*d* such as the end caps 404*b* illustrated in FIG. 4A. However, in other embodiments, the coolant may be redirected in other ways, such as by the structure of the connection between the cooling passages 112 and 114 in the ends 104*c* and 104*d* themselves.

In 730, the coolant is passed from the second cooling passages into the anode support structure. For example, the coolant may pass into the cooling passage 110*a*. In some embodiments, the coolant may be returned to a cooling system 250 as illustrated in FIG. 2

In some embodiments, operating the x-ray system 100 may include electrically connecting to the anode through the anode support structure. For example, as illustrated in FIG. 2 an electrical connection to the anode 104 from the HV source 260 may be formed through conductive structures of the anode support structure 106.

In some embodiments, dividing the coolant at the anode in 710 includes dividing the coolant to extend perpendicular to the anode support structure 106. For example, a major axis of the anode support structure 106 may extend in the Z direction. The coolant may flow in the anode support structure 106 generally in the Z direction. However, when the coolant reaches the anode 104, the coolant may be directed towards perpendicular paths in the X direction.

In some embodiments, directing the coolant through the anode support structure in 700 includes passing the coolant through the anode support structure to the anode coaxially with the coolant passing through the anode support structure from the anode. For example, the coolant passing through the cooling passages 110*a* and 110*b* in the anode support structure 106 may be coaxial.

Some embodiments include supporting the anode 104 with only the anode support structure. For example, the anode 104 may be disposed in the vacuum enclosure 201. The anode support structure 106 may be the only physical support structure supporting the anode 104 within the vacuum enclosure 201.

Figure 8A:
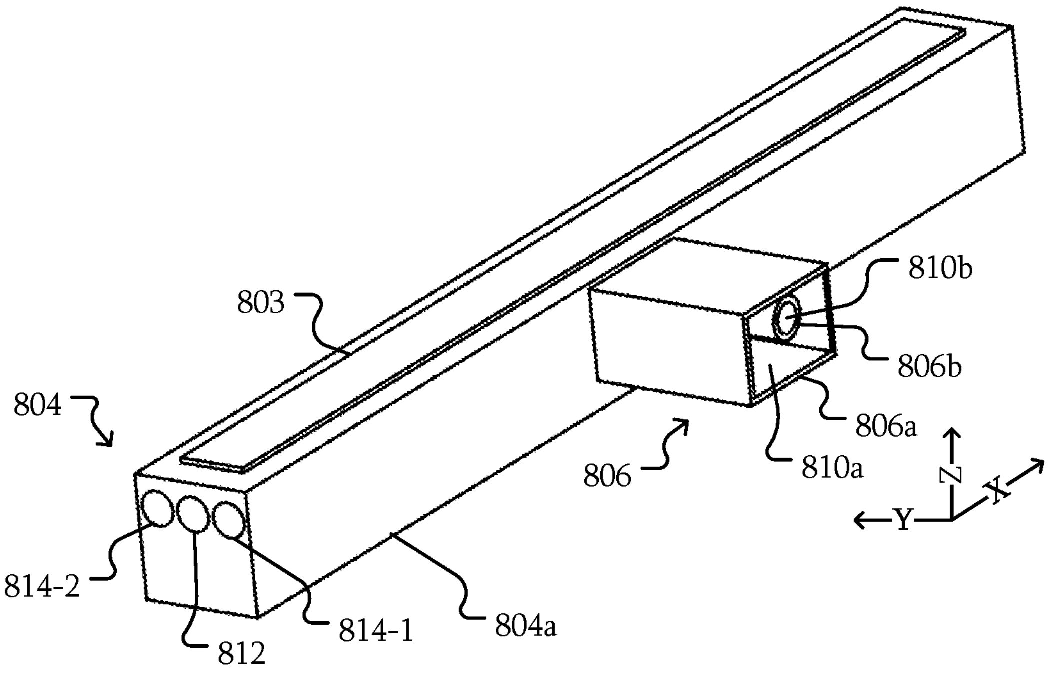
FIG. 8A is a perspective view of an anode and an anode support structure according to some embodiments.
Figure 8B:
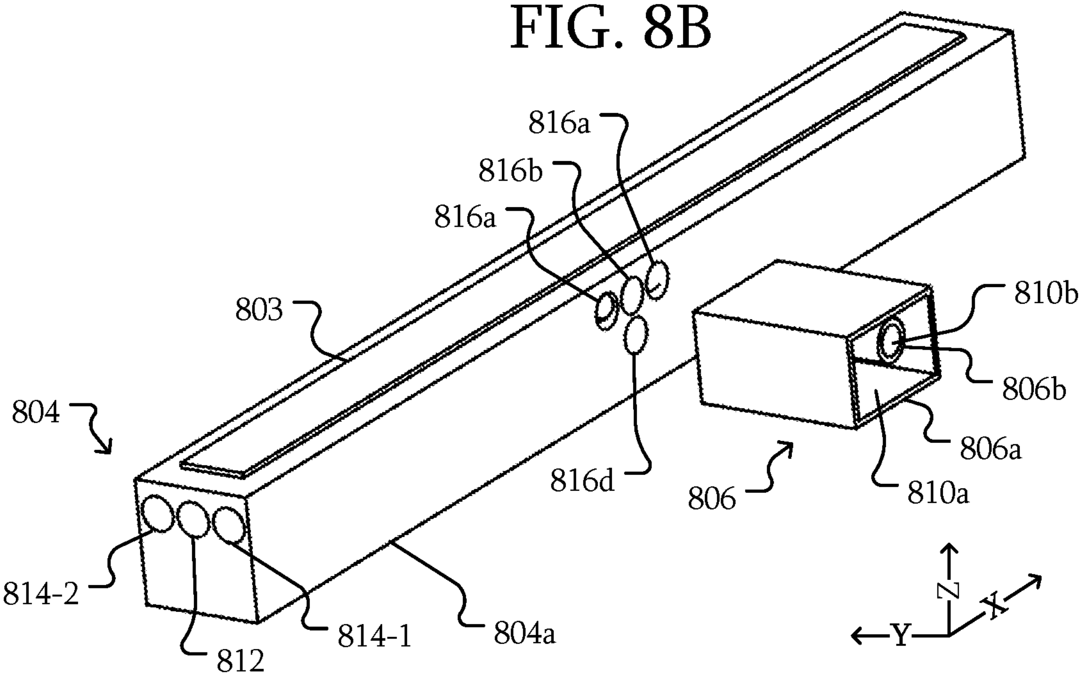
FIG. 8B is an exploded view of the anode and anode support structure of FIG. 8A.
Figure 8C:
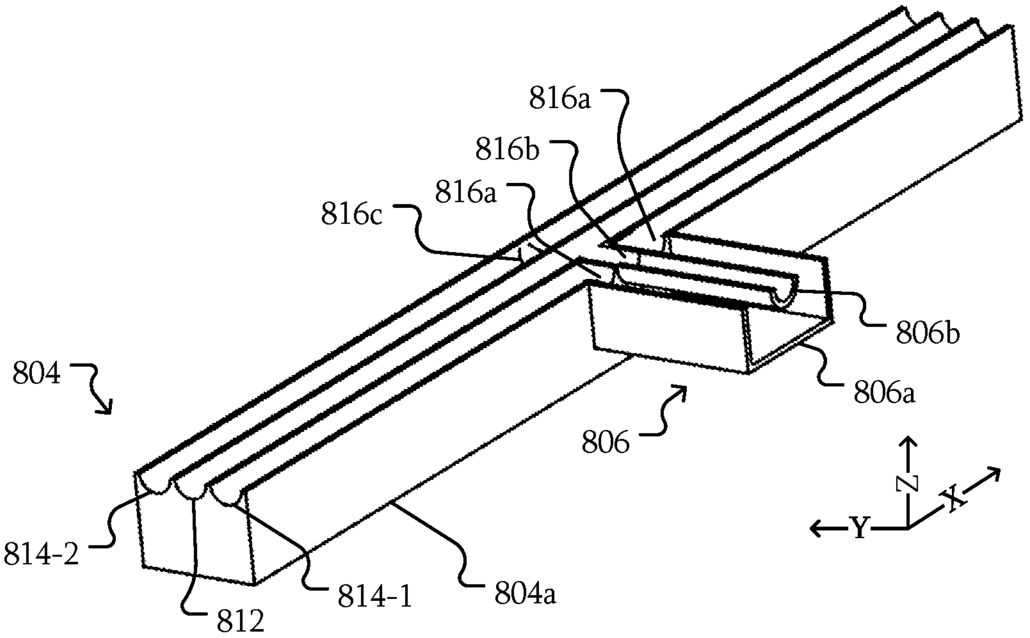
FIGS. 8C-8E are various cutaway views of the anode and anode support structure of FIG. 8A showing cooling channels according to some embodiments.
Figure 8D:
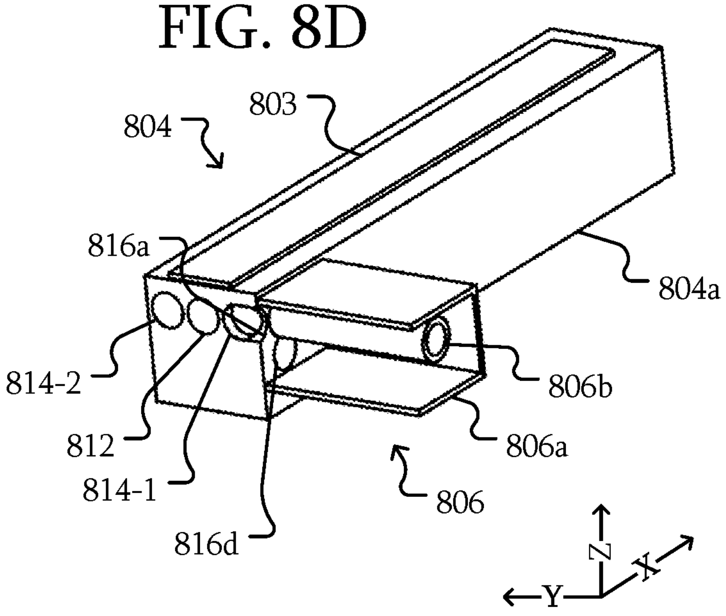
Figure 8E:
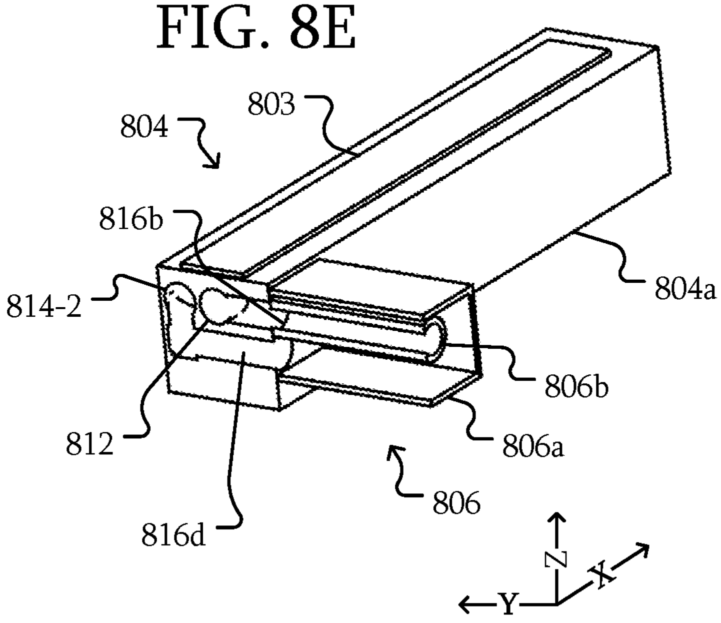

FIG. 8A is a perspective view of an anode and an anode support structure according to some embodiments. FIG. 8B is an exploded view of the anode and anode support structure of FIG. 8A. FIGS. 8C-8E are various cutaway views of the anode and anode support structure of FIG. 8A showing cooling channels according to some embodiments. Referring to FIGS. 8A-8E, in some embodiments, the anode 804 and anode support structure 806 may be similar to those described above. However, the anode support structure 806 is coupled to the anode 804 on a side of the anode 804. In some embodiments, the anode 804 is coupled to the anode support structure 806 on a side of the anode different from a side of the anode 804 including the target 803 and different from axial ends of the anode 804 on a major axis of the anode 804. In this example, the major axis of the anode 804 is along the X direction. The anode support structure 806 is coupled to the anode 804 at a side of the anode 804 at about a midpoint along the anode 804 along the X-direction. However, as described above, the anode support structure 806 may be coupled to the anode 804 in different positions along the X-direction.

The openings 816*a* couple the cooling passage 814-1 to the cooling passage 810*a* of the anode support structure 806. The opening 816*b* couples the cooling passage 812 to the cooling passage 810*b*. The cooling passage 814-1 may be interrupted by the opening 816*b*. Various structures, walls, or the like may isolate the opening 816*b* from the cooling passage 814-1.

Opening 816*d* may couple the cooling passage 810*a* to the cooling passage 814-2. The opening 814*d* may extend under the cooling passages 812 and 814-1 to an opening 816*c*. The opening 816 may couple the opening 816*d* to the cooling passage 814-2.

Although a particular configuration of cooling passages, openings, inner and outer walls, or the like has been used as an example, in other embodiments the number, placement, size, shape, or the like may be different. For example, the number of anode support structures 806 may be more than one similar to embodiments described with respect to FIGS. 3A and 3B. Other features described above, such as the end caps, shroud, or the like may be included. Regardless, as the anode support structure 806 is not coupled to the axial ends along the major axis in the X-direction of the anode 804, the anode 804 may experience less distortion in operation as described above.

A system, comprising: a vacuum enclosure (201); an anode support structure (106, 406, 606, 806) penetrating the vacuum enclosure (201) and including a plurality of first cooling passages (110, 410, 610, 810); and an anode (104, 404, 504, 604, 804) disposed within the vacuum enclosure (201), coupled to and supported by the anode support structure (106, 406, 606, 806), and including: a target (103, 403, 503, 603, 803); and a plurality of second cooling passages (112, 114, 412, 414, 512, 514, 612, 614, 812, 814); wherein: each of the second cooling passages (112, 114, 412, 414, 512, 514, 612, 614, 812, 814) is coupled to a corresponding first cooling passage (110, 410, 610, 810); and the anode (104, 404, 504, 604, 804) is coupled to the anode support structure (106, 406, 606, 806) on a side of the anode (104, 404, 504, 604, 804) different from a side of the anode (104, 404, 504, 604, 804) including the target (103, 403, 503, 603, 803) and different from axial ends of the anode (104, 404, 504, 604, 804) on a major axis of the anode.

In some embodiments, the anode (104, 404, 504, 604, 804) is coupled to the anode support structure (106, 406, 606, 806) on a side of the anode (104, 404, 504, 604, 804) opposite to the target (103, 403, 503, 603, 803).

In some embodiments, the anode support structure (106, 406, 606, 806) is the only structural support for the anode (104, 404, 504, 604, 804) within the vacuum enclosure (201).

In some embodiments, the anode support structure (106, 406, 606, 806) is the only electrical connection to the anode (104, 404, 504, 604, 804) within the vacuum enclosure (201).

In some embodiments, the anode (104, 404, 504, 604, 804) is a linear anode.

In some embodiments, the linear anode (104, 404, 504, 604, 804) has a length to width aspect ratio greater than or equal to at least one of 4:1, 10:1, 25:1, 50:1, and 100:1.

In some embodiments, the target (103, 403, 503, 603, 803) is one of a plurality of target (103, 403, 503, 603, 803) s extending in a line or plane perpendicular to the anode support structure (106, 406, 606, 806).

In some embodiments, the plurality of second cooling passages (112, 114, 412, 414, 512, 514, 612, 614, 812, 814) are substantially perpendicular to the plurality of first cooling passages (110, 410, 610, 810).

In some embodiments, the anode (104, 404, 504, 604, 804) further comprises: a base (104*a*, 404*a*, 504*a*, 604*a*, 804*a*); and a first end cap (404*c*, 404*d*, 604*c*, 604*d*) and a second end cap (404*c*, 404*d*, 604*c*, 604*d*) disposed on opposite ends of the base (104*a*, 404*a*, 504*a*, 604*a*, 804*a*); wherein: the target (103, 403, 503, 603, 803) is disposed on the base (104*a*, 404*a*, 504*a*, 604*a*, 804*a*); the second cooling passages (112, 114, 412, 414, 512, 514, 612, 614, 812, 814) extend through the base (104*a*, 404*a*, 504*a*, 604*a*, 804*a*) from the first end cap (404*c*, 404*d*, 604*c*, 604*d*) to the second end cap (404*c*, 404*d*, 604*c*, 604*d*); and for each of the end caps (404*c*, 404*d*, 604*c*, 604*d*), the end cap (404*c*, 404*d*, 604*c*, 604*d*) couples together at least in part at least some of the second cooling passages.

In some embodiments, the anode support structure (106, 406, 606, 806) is coupled to the base (104*a*, 404*a*, 504*a*, 604*a*, 804*a*) at a location on the base (104*a*, 404*a*, 504*a*, 604*a*, 804*a*) between 25% and 75% of a longest dimension of the base (104*a*, 404*a*, 504*a*, 604*a*, 804*a*); and the second cooling passages (112, 114, 412, 414, 512, 514, 612, 614, 812, 814) extend from the anode support structure (106, 406, 606, 806) to the opposite ends of the base (104*a*, 404*a*, 504*a*, 604*a*, 804*a*).

In some embodiments, the first cooling passages (110, 410, 610, 810) are coaxial within the anode support structure (106, 406, 606, 806).

In some embodiments, a first one of the second cooling passages (112, 114, 412, 414, 512, 514, 612, 614, 812, 814) is disposed along a central axis of the anode (104, 404, 504, 604, 804); and a second one of the second cooling passages (112, 114, 412, 414, 512, 514, 612, 614, 812, 814) and a third one of the second cooling passages (112, 114, 412, 414, 512, 514, 612, 614, 812, 814) are disposed on opposite sides of the first one of the second cooling passages (112, 114, 412, 414, 512, 514, 612, 614, 812, 814).

In some embodiments, the end caps (404*c*, 404*d*, 604*c*, 604*d*) are separated from the vacuum enclosure (201).

In some embodiments, one of the first cooling passages (110, 410, 610, 810) of the anode support structure (106, 406, 606, 806) is coupled to multiple second cooling passages (112, 114, 412, 414, 512, 514, 612, 614, 812, 814) of the anode.

In some embodiments, the anode support structure (106, 406, 606, 806) forms an electrical connection to the anode (104, 404, 504, 604, 804) from outside of the vacuum enclosure (201).

In some embodiments, the system further comprises a cathode (224) disposed within the vacuum enclosure (201) and configured to emit at least one electron beam towards the target (103, 403, 503, 603, 803).

In some embodiments, the system further comprises a shroud (450) disposed over the target (103, 403, 503, 603, 803) and electrically coupled to the base (104*a*, 404*a*, 504*a*, 604*a*, 804*a*), the shroud including a plurality of openings (452) configured to permit at least one electron beam to reach the target (103, 403, 503, 603, 803).

In some embodiments, the system further comprises a cooling system (250) configured to supply coolant to one of the first cooling passages (110, 410, 610, 810); wherein the first cooling passage is coupled to at least one of the second cooling passages (112, 114, 412, 414, 512, 514, 612, 614, 812, 814); and the at least one of the second cooling passages (112, 114, 412, 414, 512, 514, 612, 614, 812, 814) are disposed proximate to the target (103, 403, 503, 603, 803) along a major axis of the target (103, 403, 503, 603, 803).

A method, comprising: directing a coolant through an anode support structure (106, 406, 606, 806) penetrating a vacuum enclosure (201) towards an anode (104, 404, 504, 604, 804) within the vacuum enclosure (201); dividing the coolant at or in the anode (104, 404, 504, 604, 804) to flow in opposite directions in first cooling passages (110, 410, 610, 810) within the anode; redirecting the coolant at the ends of the first cooling passages (110, 410, 610, 810) into second cooling passages (112, 114, 412, 414, 512, 514, 612, 614, 812, 814) extending towards the anode support structure (106, 406, 606, 806); and passing the coolant from the second cooling passages (112, 114, 412, 414, 512, 514, 612, 614, 812, 814) into the anode support structure (106, 406, 606, 806).

In some embodiments, the method further comprises electrically connecting to the anode (104, 404, 504, 604, 804) through the anode support structure (106, 406, 606, 806).

In some embodiments, dividing the coolant at the anode (104, 404, 504, 604, 804) comprises dividing the coolant to extend perpendicular to the anode support structure (106, 406, 606, 806).

In some embodiments, directing the coolant through the anode support structure (106, 406, 606, 806) comprises passing the coolant through the anode support structure (106, 406, 606, 806) to the anode (104, 404, 504, 604, 804) coaxially with the coolant passing from the anode (104, 404, 504, 604, 804) through the anode support structure (106, 406, 606, 806).

In some embodiments, the method further comprises supporting the anode (104, 404, 504, 604, 804) with only the anode support structure (106, 406, 606, 806).

A system, comprising: means for converting an electron beam into x-rays including means for directing coolant through the means for converting the electron beam into the x-rays; and means for supporting the means for converting the electron beam into the x-rays, including means for supplying coolant to means for converting the electron beam into the x-rays; wherein the means for converting the electron beam into the x-rays further includes means for dividing the coolant supplied to the means for converting the electron beam into the x-rays.

Examples of the means for converting an electron beam into x-rays include the anode 104, 404, 504, 604, and 804 and target 102, 403, 503, 603, and 803.

Examples of the means for directing coolant through the means for converting the electron beam into the x-rays include cooling passages 112, 114, 412, 414, 512, 514, 612, 614, 812, and 814 and openings 116, 416, 516, 616, and 816.

Examples of the means for supporting the means for converting the electron beam into the x-rays include the anode support structure 106, 406, 606, and 806.

Examples of the means for supplying coolant to the means for converting the electron beam into the x-rays include cooling passages 110, 410, 610, and 810.

Examples of the means for dividing the coolant supplied to the means for converting the electron beam into the x-rays include various structures at the interface between the cooling passages 110, 410, 610, and 810 and the cooling passages 112, 114, 412, 414, 512, 514, 612, 614, 812, and 814.

Examples of the means for electrically connecting to the means for converting the electron beam into the x-rays include electrically conductive portions of the anode support structure 106, 406, 606, and 806.

Some embodiments include a method, comprising: providing an anode support structure including a plurality of first cooling passages; providing a base (104*a*, 404*a*, 504*a*, 604*a*, 804*a*); forming a target on the base (104*a*, 404*a*, 504*a*, 604*a*, 804*a*); forming a plurality of second cooling passages in the base (104*a*, 404*a*, 504*a*, 604*a*, 804*a*) extending along the base (104*a*, 404*a*, 504*a*, 604*a*, 804*a*) beneath the target; and attaching the anode support structure to a side of the base (104*a*, 404*a*, 504*a*, 604*a*, 804*a*) opposite to the target such that the first cooling passages and the second cooling passages are coupled together.

In some embodiments, forming the second cooling passages in the base (104*a*, 404*a*, 504*a*, 604*a*, 804*a*) comprises: forming the second cooling passages extending through the base (104*a*, 404*a*, 504*a*, 604*a*, 804*a*).

In some embodiments, forming the second cooling passages in the base (104*a*, 404*a*, 504*a*, 604*a*, 804*a*) further comprises: attaching end caps (404*c*, 404*d*, 604*c*, 604*d*) to ends of the base (104*a*, 404*a*, 504*a*, 604*a*, 804*a*) such that for each end cap (404*c*, 404*d*, 604*c*, 604*d*), the end cap (404*c*, 404*d*, 604*c*, 604*d*) couples together at least in part at least some of the second cooling passages.

In some embodiments, the method further comprises: forming a plurality of openings in the base (104*a*, 404*a*, 504*a*, 604*a*, 804*a*) exposing the second cooling passages; wherein attaching the anode support structure comprises attaching the anode support structure to the base (104*a*, 404*a*, 504*a*, 604*a*, 804*a*) at the openings in the base (104*a*, 404*a*, 504*a*, 604*a*, 804*a*).

In some embodiments, the method further comprises: attaching a shroud (450) to the anode (104, 404, 504, 604, 804).

In some embodiments, the method further comprises: providing a vacuum enclosure (201); and mounting the anode support structure (106, 406, 606, 806) to the vacuum enclosure (201) such that the anode support structure (106, 406, 606, 806) penetrates the vacuum enclosure (201).

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. A system, comprising:
a vacuum enclosure;
an anode support structure penetrating the vacuum enclosure and including a plurality of first cooling passages; and
an anode disposed within the vacuum enclosure, coupled to and supported by the anode support structure, and including:
a target; and
a plurality of second cooling passages;
wherein:
each of the second cooling passages is coupled to a corresponding first cooling passage;
the anode is coupled to the anode support structure on a side of the anode different from a side of the anode including the target and different from axial ends of the anode on a major axis of the anode; and
the anode is a linear anode.

2. The system of claim 1, wherein:
the anode is coupled to the anode support structure on a side of the anode opposite to the target.

3. The system of claim 1, wherein:
the anode support structure is the only structural support for the anode within the vacuum enclosure.

4. The system of claim 1, wherein:
the anode support structure is the only electrical connection to the anode within the vacuum enclosure.

5. The system of claim 1, wherein:
the anode is a stationary anode.

6. The system of claim 1, wherein:
the linear anode has a length to width aspect ratio greater than or equal to 4:1.

7. The system of claim 1, wherein:
the target is one of a plurality of targets extending in a line or plane perpendicular to the anode support structure.

8. The system of claim 1, wherein the anode further comprises:
a base; and
a first end cap and a second end cap disposed on opposite ends of the base;
wherein:
the target is disposed on the base;
the second cooling passages extend through the base from the first end cap to the second end cap; and
for each of the end caps, the end cap couples together at least in part at least some of the second cooling passages.

9. The system of claim 8, wherein:
the anode support structure is coupled to the base at a location on the base that is at least 25% of a length of a longest dimension of the base from either of the opposite ends along the longest dimension of the base; and
the second cooling passages extend from the anode support structure to the opposite ends of the base.

10. The system of claim 9, wherein:
a first one of the second cooling passages is disposed along a central axis of the anode; and
a second one of the second cooling passages and a third one of the second cooling passages are disposed on opposite sides of the first one of the second cooling passages.

11. The system of claim 8, wherein:
the end caps are separate from walls of the vacuum enclosure.

12. The system of claim 1, wherein:
one of the first cooling passages of the anode support structure is coupled to multiple second cooling passages of the anode.

13. The system of claim 1, wherein:
the anode support structure forms an electrical connection to the anode from outside of the vacuum enclosure.

14. The system of claim 1, further comprising:
a shroud disposed over the target and electrically coupled to the anode, the shroud including a plurality of openings configured to permit at least one electron beam to reach the target.

15. A method, comprising:
directing a coolant through an anode support structure penetrating a vacuum enclosure towards a linear anode within the vacuum enclosure;
dividing the coolant at or in the linear anode to flow in a plurality of different directions in first cooling passages within the linear anode;
redirecting the coolant at the ends of the first cooling passages into second cooling passages extending towards the anode support structure; and
passing the coolant from the second cooling passages into the anode support structure.

16. The method of claim 15, further comprising electrically connecting to the linear anode through the anode support structure.

17. The method of claim 15, wherein dividing the coolant at the linear anode comprises dividing the coolant to extend perpendicular to the anode support structure.

18. The method of claim 15, further comprising supporting the linear anode with only the anode support structure.

19. A system, comprising:

linear means for converting an electron beam into x-rays within a vacuum enclosure;

means for supporting the linear means for converting the electron beam into the x-rays and for supplying coolant to the linear means for converting the electron beam into the x-rays;

means for directing the coolant through the linear means for converting the electron beam into the x-rays within the linear means for converting the electron beam into the x-rays;

means for dividing the coolant supplied to the linear means for converting the electron beam into the x-rays within the linear means for converting the electron beam into the x-rays; and means for supporting the linear means for converting the electron beam into the x-rays and for supplying coolant to the linear means for converting the electron beam into the x-rays.

20. The system of claim 19, further comprising means for electrically connecting to the linear means for converting the electron beam into the x-rays within the means for supporting the linear means for converting the electron beam into the x-rays and for supplying coolant to the linear means for converting the electron beam into the x-rays.

* * * * *